United States Patent
Sakamoto et al.

(10) Patent No.: US 10,406,889 B2
(45) Date of Patent: Sep. 10, 2019

(54) HEAT PUMP SYSTEM

(71) Applicant: DENSO CORPORATION, Kariya, Aichi-pref. (JP)

(72) Inventors: Kota Sakamoto, Kariya (JP); Satoshi Itoh, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 83 days.

(21) Appl. No.: 15/038,484

(22) PCT Filed: Oct. 30, 2014

(86) PCT No.: PCT/JP2014/005501
§ 371 (c)(1),
(2) Date: May 23, 2016

(87) PCT Pub. No.: WO2015/075872
PCT Pub. Date: May 28, 2015

(65) Prior Publication Data
US 2016/0297283 A1      Oct. 13, 2016

(30) Foreign Application Priority Data
Nov. 25, 2013 (JP) ................. 2013-242521

(51) Int. Cl.
*B60H 1/00* (2006.01)
*F25B 49/02* (2006.01)
*F25B 47/02* (2006.01)

(52) U.S. Cl.
CPC ......... *B60H 1/00921* (2013.01); *F25B 47/02* (2013.01); *F25B 49/02* (2013.01);
(Continued)

(58) Field of Classification Search
CPC .............. B60H 1/00921; B60H 2001/00928
See application file for complete search history.

(56) References Cited

U.S. PATENT DOCUMENTS

| 9,180,753 B2 * | 11/2015 | Kim ............... B60H 1/00885 |
| 2008/0041071 A1 * | 2/2008 | Itoh ................ B60H 1/00342 62/79 |

(Continued)

FOREIGN PATENT DOCUMENTS

| DE | 102012205322 A1 | 10/2012 |
| JP | S54099889 A | 8/1979 |

(Continued)

*Primary Examiner* — Christopher R Zerphey
(74) *Attorney, Agent, or Firm* — Harness, Dickey & Pierce, P.L.C.

(57) ABSTRACT

A heater core for exchanging heat between a coolant and ventilation air to be blown into a vehicle interior is disposed in a high-pressure side heat-medium circulation circuit that allows for circulation of the coolant heated by a heat pump cycle. A radiator for exchanging heat between at least a part of the coolant flowing out of the heater core and a low-pressure refrigerant in the heat pump cycle is disposed in a low-pressure side heat-medium circulation circuit coupled to the high-pressure side heat-medium circulation circuit. Thus, excessive heat included in the coolant flowing out of the heater core and which is not used to heat the ventilation air can suppress frost formation on an exterior heat exchanger and can also defrost the exterior heat exchanger.

20 Claims, 15 Drawing Sheets

(52) U.S. Cl.
CPC ............ *B60H 2001/00928* (2013.01); *F25B 2347/02* (2013.01); *F25B 2400/05* (2013.01)

(56) References Cited

U.S. PATENT DOCUMENTS

| | | |
|---|---|---|
| 2012/0174602 A1 | 7/2012 | Olivier et al. |
| 2012/0253573 A1 | 10/2012 | Shigyo |
| 2012/0261110 A1 | 10/2012 | Katoh et al. |
| 2015/0362268 A1* | 12/2015 | Maeda ............... G05D 23/1917 165/294 |

FOREIGN PATENT DOCUMENTS

| | | |
|---|---|---|
| JP | 09-052508 | 2/1997 |
| JP | 2012506820 A | 3/2012 |
| JP | 2013500903 A | 1/2013 |
| JP | 2013139251 A | 7/2013 |

* cited by examiner

HEAT PUMP SYSTEM

CROSS REFERENCE TO RELATED APPLICATIONS

This application is a U.S. National Phase Application under 35 U.S.C. 371 of International Application No. PCT/JP2014/005501 filed on Oct. 30, 2014 and published in Japanese as WO 2015/075872 A1 on May 28, 2015. This application is based on and claims the benefit of priority from Japanese Patent Application 2013-242521 filed on Nov. 25, 2013. The entire disclosures of all of the above applications are incorporated herein by reference.

FIELD OF THE INVENTION

The present disclosure relates to a heat pump system that heats a fluid to be heated by a heat pump cycle.

BACKGROUND ART

Heat pump systems are conventionally known to heat a heating target fluid by heat pump cycles (vapor-compression refrigeration cycles). In the heat pump cycle applied to this kind of system, an exterior heat exchanger serves as an evaporator that evaporates a low-pressure refrigerant by exchanging heat with the outside air. When a refrigerant evaporation temperature at the exterior heat exchanger is decreased to 0° C. or lower, frost formation might occur in the exterior heat exchanger.

Further, the so-called hot gas defrosting is also known as a means for removing frost formed in the exterior heat exchanger in this way. The hot gas defrosting involves allowing a high-temperature, high-pressure refrigerant (hot gas) discharged out of a compressor in the heat pump cycle to flow into the exterior heat exchanger, thereby defrosting the heat exchanger. However, it takes a relatively long time to carry out hot gas defrosting, which might increase the energy consumed by the compressor for defrosting.

For this reason, Patent Document 1 discloses a heat pump system for use in a vehicle air conditioner. The heat pump system is designed to defrost the exterior heat exchanger with frost formation using waste heat as a heat source, which is stored in a coolant for cooling vehicle-mounted electric devices. In the heat pump system disclosed in Patent Document 1, the exterior heat exchanger can be defrosted using the waste heat from the vehicle-mounted electric devices, thereby suppressing an increase in energy consumption by the compressor for defrosting.

RELATED ART DOCUMENT

Patent Document

Patent Document 1: Japanese Unexamined Patent Application Publication No. 2013-139251

SUMMARY OF INVENTION

However, based on the studies by the inventors of the present application, like the heat pump system described in Patent Document 1, a structure that is designed to defrost an exterior heat exchanger with heat supplied from an external heat source, such as a vehicle-mounted electric device, cannot sufficiently ensure the heat required for defrosting in some cases, depending on the operating state of the external heat source. As a result, the heat supplied from the external heat source cannot appropriately defrost the exterior heat exchanger or cannot suppress the frost formation in the exterior heat exchanger.

The present disclosure has been made in view of the foregoing matter, and it is an object of the present disclosure to provide a heat pump system that can achieve defrosting of an exterior heat exchanger or suppression of frost formation therein without increasing the energy consumption of a compressor in a heat pump cycle.

To achieve the above object, a heat pump system according to an aspect of the present disclosure includes a heat pump cycle, a heat-medium circulation circuit and a heat-medium radiation portion. The heat pump cycle includes a compressor adapted to compress and discharge a refrigerant, a heat medium-refrigerant heat exchanger that exchanges heat between a high-pressure refrigerant discharged from the compressor and a heat medium, a decompression device that decompresses the refrigerant flowing out of the heat medium-refrigerant heat exchanger, and an exterior heat exchanger that exchanges heat between the refrigerant decompressed by the decompression device and outside air. The heat medium circulates in the heat-medium circulation circuit, and the heat-medium circulation circuit is provided with a heating heat exchanger that exchanges heat between a heating target fluid and the heat medium flowing out of the heat medium-refrigerant heat exchanger to heat the heating target fluid. The heat-medium radiation portion dissipates heat included in the heat medium flowing out of the heating heat exchanger, to a low-pressure refrigerant circulating through a range leading from an outlet side of the decompression device to a suction port of the compressor.

The heat-medium radiation portion is provided to enable dissipation of the heat included in the heat medium circulating through the heat-medium circulation circuit, into the low-pressure refrigerant. Then, the heat dissipated from the heat medium into the low-pressure refrigerant can defrost the exterior heat exchanger and suppress the frost formation of the exterior heat exchanger.

Further, the heat-medium radiation portion dissipates heat included in the heat medium flowing out of the heating heat exchanger into the low-pressure refrigerant, so that the heat included in the heat medium heated by the heat medium-refrigerant heat exchanger can be used to preferentially heat the heating target fluid, and excessive heat can be used to defrost or suppress the frost formation of the exterior heat exchanger. Therefore, the defrosting of the exterior heat exchanger or restriction of frost formation at the exterior heat exchanger can be achieved without increasing an energy consumption of the compressor.

Accordingly, the heat pump system can be provided that is capable of defrosting the exterior heat exchanger or suppressing the frost formation therein without depending on the heat supplied from the external heat source and the like and without increasing energy consumption of the compressor in the heat pump cycle.

For example, the heat-medium radiation portion may be configured of a heat exchanger for heat-medium radiation that exchanges heat between the outside air and the heat medium flowing out of the heating heat exchanger. The heat exchanger for heat-medium radiation and the exterior heat exchanger may be integrated together to enable heat transfer between the refrigerant circulating through the exterior heat exchanger and the heat medium circulating through the heat exchanger for heat-medium radiation.

With this arrangement, the heat included in the heat medium circulating through the heat exchanger for heat-medium radiation can be transferred directly to the exterior heat exchanger, which can achieve the effective defrosting of the exterior heat exchanger or the effective suppression of the frost formation at the exterior heat exchanger.

For example, the heat-medium radiation portion may be configured of a heat exchanger for heat-medium radiation that exchanges heat between the outside air and the heat medium flowing out of the heating heat exchanger. The exterior heat exchanger may be disposed to exchange heat between the outside air flowing out of the heat exchanger for heat-medium radiation and the refrigerant decompressed by the decompression device.

With this arrangement, the heat included in the heat medium circulating through the heat exchanger for heat-medium radiation can be transferred indirectly to the exterior heat exchanger via the outside air, which can easily achieve the defrosting of the exterior heat exchanger or the suppression of the frost formation at the exterior heat exchanger.

The heat-medium radiation portion may be configured of a heat exchanger for heat-medium radiation that exchanges heat between the low-pressure refrigerant and the heat medium flowing out of the heating heat exchanger.

With this arrangement, the heat included in the heat medium circulating through the heat exchanger for heat-medium radiation can be absorbed in the low-pressure refrigerant, thus increasing the refrigerant evaporation temperature at the exterior heat exchanger, achieving the suppression of frost formation.

Further, the heat pump system including the above-mentioned heat exchanger for heat-medium radiation may include a heat-medium flow-rate adjustment device that adjusts the flow rate of heat medium flowing out of the heating heat exchanger into the heat exchanger for heat-medium radiation.

With this arrangement, the amount of heat dissipated from the heat medium into the low-pressure refrigerant can be adjusted as appropriate, depending on the heating capacity for the heating target fluid required for the heat pump cycle.

DESCRIPTION OF EMBODIMENTS

First Embodiment

A first embodiment of the present disclosure will be described below with reference to FIGS. 1 to 4. In this embodiment, a heat pump system 1 according to the present disclosure is applied to a vehicle air conditioner for a so-called hybrid vehicle that obtains the driving force for traveling from both an internal combustion engine (engine) and an electric motor for traveling. The heat pump system 1 in this embodiment serves to heat or cool ventilation air to be blown into a vehicle interior as a space to be air-conditioned in the vehicle air conditioner.

More specifically, the heat pump system 1 of this embodiment includes a heat pump cycle 10 that is a vapor-compression refrigeration cycle for heating or cooling ventilation air, and a heat-medium circulation circuit 20 for circulation of a coolant as a heat medium (e.g., an ethylene glycol aqueous solution). When intended to heat ventilation air, the coolant is heated by the heat pump cycle 10, and then the ventilation air is heated using the heated coolant as a heat source. Therefore, in the heat pump system 1 of this embodiment, a fluid to be heated is the ventilation air.

Further, the heat pump cycle 10 of this embodiment can be configured to switch among a refrigerant circuit for an air-cooling mode of air-cooling of the vehicle interior by cooling the ventilation air, a refrigerant circuit for an air-heating mode of air-heating of the vehicle interior by heating the ventilation air, and a refrigerant circuit for a dehumidification heating mode of performing air-heating while dehumidifying the vehicle interior by heating the ventilation air cooled and dehumidified.

Figure 1:
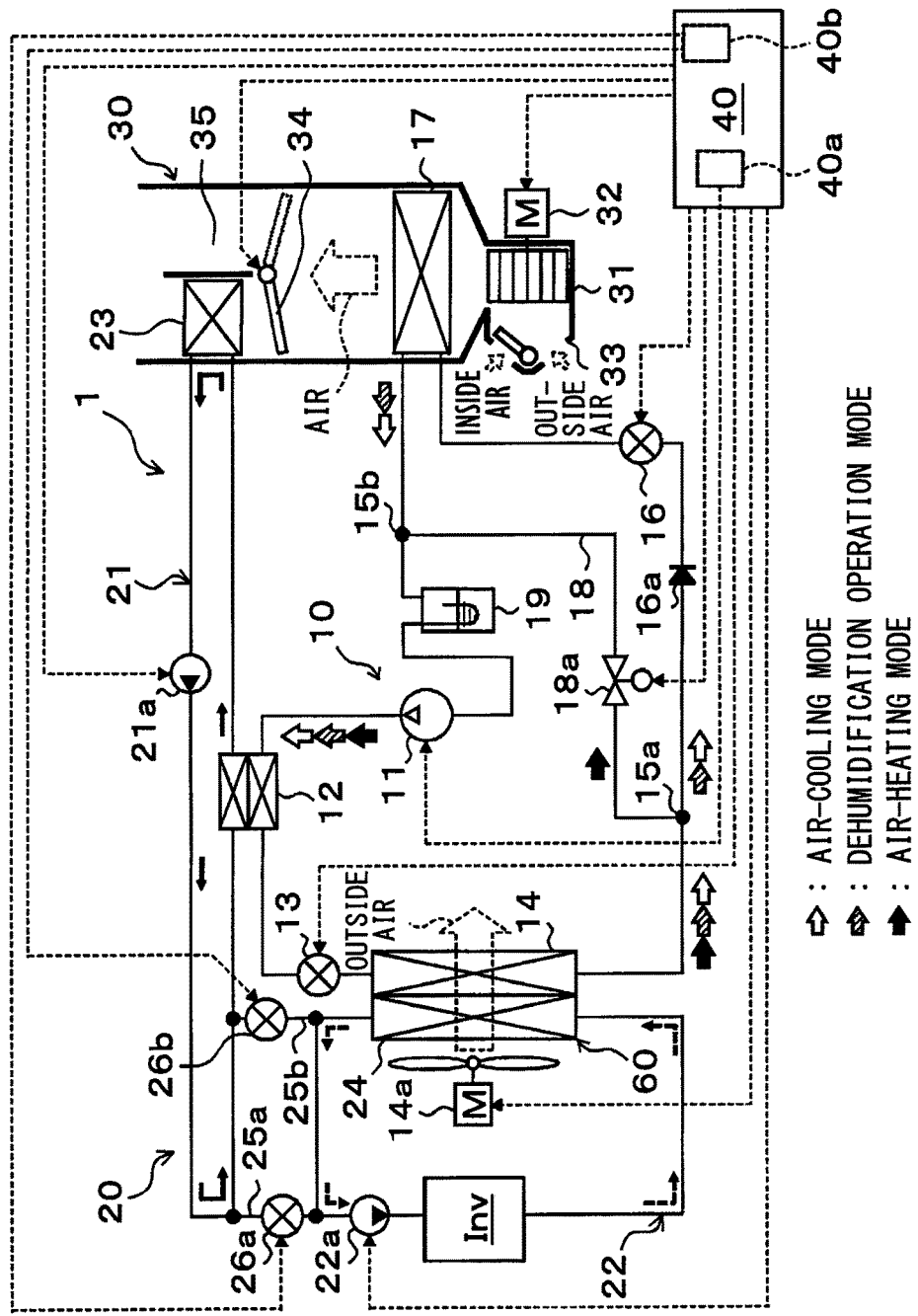
FIG. 1 is a schematic entire configuration diagram of a heat pump system according to a first embodiment.

Note that in FIG. 1, the flow of a refrigerant in the refrigerant circuit for the air-cooling mode is indicated by outlined arrows; the flow of a refrigerant in the refrigerant circuit for the air-heating mode is indicated by black arrows; and the flow of a refrigerant in the refrigerant circuit for the dehumidification heating mode is indicated by diagonal hatched arrows.

The heat pump cycle 10 employs a hydrofluorocarbon (HFC) based refrigerant (for example, R134a) as the refrigerant, and constitutes a vapor-compression subcritical refrigeration cycle where its high-pressure side refrigerant pressure Pd does not exceed the critical pressure of the refrigerant. Obviously, a hydrofluoro-olefin (HFO) based refrigerant (for example, R1234yf) or the like may be used as the refrigerant. Refrigerating machine oil for lubricating a compressor 11 is mixed into the refrigerant, and a part of the refrigerating machine oil circulates through the cycle together with the refrigerant.

Among the components of the heat pump cycle 10, the compressor 11 is positioned within an engine room and adapted to draw the refrigerant and pressurize it into a high-pressure refrigerant, and then to discharge the pressurized refrigerant in the heat pump cycle 10. Specifically, the compressor 11 of this embodiment is an electric compressor that accommodates, in one housing, a fixed displacement compression mechanism and an electric motor for driving the compression mechanism.

Various types of compression mechanisms, including a scroll compression mechanism and a vane compression mechanism, can be employed as the compression mechanism. The electric motor has its operation (the number of revolutions) controlled by a control signal output from an air conditioning controller 40 to be described later. The electric motor may employ either an AC motor or a DC motor.

A discharge port side of the compressor 11 is coupled to a refrigerant inlet side of a refrigerant passage in a high-temperature side coolant-refrigerant heat exchanger 12. The high-temperature side coolant-refrigerant heat exchanger 12 is a heat medium-refrigerant heat exchanger to heat the coolant by exchanging heat between a high-pressure refrigerant discharged from the compressor 11 and a coolant circulating through the heat-medium circulation circuit 20.

Such a high-temperature side coolant-refrigerant heat exchanger 12 can employ a heat exchanger or the like in which a plurality of tubes for circulation of the high-pressure refrigerant is provided as a high-pressure refrigerant passage, coolant passages for circulation of the coolant are formed between the adjacent tubes, and inner fins are disposed in the coolant passages to promote heat exchange between the refrigerant and the coolant.

The outlet side of the refrigerant passage of the high-temperature side coolant-refrigerant heat exchanger 12 is coupled to the inlet side of a heating expansion valve 13. The heating expansion valve 13 is a decompression device that decompresses the high-pressure refrigerant discharged from the high-temperature side coolant-refrigerant heat exchanger 12 at least in the air-heating mode. Specifically, the heating expansion valve 13 is an electric variable throttle mechanism that includes a valve body capable of changing the throttle opening degree, and an electric actuator configured of a stepping motor for changing the throttle opening degree by displacing the valve body.

The heating expansion valve 13 of this embodiment is a variable throttle mechanism with a fully opening function that serves as a single refrigerant passage by fully opening its throttle opening degree without almost exhibiting any refrigerant decompressing effect. The heating expansion valve 13 has its operation controlled by a control signal output from the air conditioning controller 40.

The outlet side of the heating expansion valve 13 is coupled to the refrigerant inlet side of an exterior heat exchanger 14. The exterior heat exchanger 14 is disposed on the front side in the engine room, and adapted to exchange heat between the refrigerant flowing therethrough on the downstream side of the high-temperature side coolant-refrigerant heat exchanger 12 and the outside air blown from a blower fan 14a.

More specifically, the exterior heat exchanger 14 serves as a radiator that dissipates heat from the high-pressure refrigerant at least in the air-cooling mode, and also as an evaporator that exhibits a heat absorption effect to evaporate the low-pressure refrigerant decompressed by the heating expansion valve 13 as the decompression device at least in the air-heating mode. The blower fan 14a is an electric blower that has its operating ratio, that is, the number of revolutions (blowing capacity) thereof controlled by a control voltage output from the air conditioning controller 40.

The exterior heat exchanger 14 of this embodiment is integrally structured with a radiator 24 to be described later. Thus, the blower fan 14a of this embodiment serves to blow the outside air toward both the exterior heat exchanger 14 and the radiator 24. Note that the detailed structure of the integrated exterior heat exchanger 14 and radiator 24 (hereinafter referred to as a "heat-exchanger structure 60") will be described later.

The refrigerant outlet side of the exterior heat exchanger 14 is coupled to a refrigerant inflow port of a low-pressure side branch portion 15a that branches the flow of refrigerant discharged from the exterior heat exchanger 14. The low-pressure side branch portion 15a is configured of a three-way joint having three inflow and outflow ports, one of which is a refrigerant inflow port, and the remaining two of which are refrigerant outflow ports. Such a three-way joint may be formed by jointing pipes with different diameters, or by forming a plurality of refrigerant passages in a metal or resin block.

One refrigerant outflow port of the low-pressure side branch portion 15a is coupled to the refrigerant inlet side of a cooling expansion valve 16 via a check valve 16a. The other refrigerant outflow port of the low-pressure side branch portion 15a is coupled to the inlet side of an accumulator-side passage 18 that guides the refrigerant flowing out of the low-pressure side branch portion 15a to the upstream side of an accumulator 19 to be described later while bypassing the cooling expansion valve 16 and the like.

The check valve 16a allows only the refrigerant flowing out of one of the refrigerant outflow ports of the low-pressure side branch portion 15a to flow from the low-pressure side branch portion 15a toward the cooling expansion valve 16.

The cooling expansion valve 16 has the substantially same basic structure as that of the heating expansion valve 13. The cooling expansion valve 16 in this embodiment is configured of a variable throttle mechanism having not only a fully-opening function but also a completely-closing function. Specifically, the cooling expansion valve 16 fully opens a refrigerant passage leading from the refrigerant outlet side of the exterior heat exchanger 14 to the refrigerant inlet side of an interior evaporator 17 when fully opening its throttle opening. Further, the cooling expansion valve 16 closes the refrigerant passage when completely closing the throttle opening.

In the heat pump cycle 10 in this embodiment, the cooling expansion valve 16 closes the refrigerant passage in this way, thereby enabling switching of the refrigerant circuit for circulation of the refrigerant. Thus, the cooling expansion valve 16 of this embodiment configures a refrigerant circuit switch.

The outlet side of the cooling expansion valve 16 is coupled to the refrigerant inlet side of the interior evaporator 17. The interior evaporator 17 is disposed in a casing 31 of an interior air conditioning unit 30 to be described later. The interior evaporator 17 is a cooling heat exchanger that exchanges heat between the refrigerant flowing therethrough and ventilation air to evaporate the refrigerant, thereby cooling the ventilation air at least in the air-cooling mode and the dehumidification heating mode.

The refrigerant outlet side of the interior evaporator 17 is coupled to the inlet side of the accumulator 19 via a merging portion 15b. The accumulator 19 is a gas-liquid separator that separates the refrigerant flowing therein, into liquid and gas phases, and which stores therein the excessive refrigerant within the cycle. The merging portion 15b is formed of the same type of three-way joint as the low-pressure side branch portion 15a. The three-way joint has three inflow and outflow ports, two of which are refrigerant inflow ports, and the remaining one of which is a refrigerant outflow port.

The other refrigerant inflow port of the merging portion 15b in this embodiment is coupled to the outlet side of the above-mentioned accumulator-side passage 18. A heating on-off valve 18a is disposed in the accumulator-side passage 18 to open and close the accumulator-side passage 18. The heating on-off valve 18a is an electromagnetic valve having the opening and closing operations thereof controlled by a control voltage output from the air conditioning controller 40, thus configuring the refrigerant circuit switch together with the cooling expansion valve 16.

A gas-phase refrigerant outlet of the accumulator 19 is coupled to a suction side of the compressor 11. Thus, the accumulator 19 serves to suppress the suction of the liquid-phase refrigerant into the compressor 11 to thereby prevent liquid compression in the compressor 11.

Next, the heat-medium circulation circuit 20 will be described. The heat-medium circulation circuit 20 of this embodiment is mainly separated into a high-pressure side heat-medium circulation circuit 21 and a low-pressure side heat-medium circulation circuit 22.

The high-pressure side heat-medium circulation circuit 21 and low-pressure side heat-medium circulation circuit 22 communicate with each other. Thus, the heat-medium circulation circuit 20 allows a part of the coolant circulating through the high-pressure side heat-medium circulation circuit 21 to flow into the low-pressure side heat-medium circulation circuit 22, while allowing a part of the coolant circulating through the low-pressure side heat-medium circulation circuit 22 to flow into the high-pressure side heat-medium circulation circuit 21 as described later.

The high-pressure side heat-medium circulation circuit 21 is a heat-medium circulation circuit that allows for circulation of the coolant mainly between a heater core 23 and the high-temperature side coolant-refrigerant heat exchanger 12. The heater core 23 is disposed in the casing 31 of the interior air conditioning unit 30. The heater core 23 is a heating heat exchanger that exchanges heat between the coolant heated by the high-temperature side coolant-refrigerant heat exchanger 12 and ventilation air having passed through the interior evaporator 17, thereby heating the ventilation air.

The high-pressure side heat-medium circulation circuit 21 is provided with a high-temperature side coolant pump 21a that pressure-feeds, to the heater core 23, the coolant flowing out of the high-temperature side coolant-refrigerant heat exchanger 12. The high-temperature side coolant pump 21a is an electric pump having the number of revolutions (coolant pressure-feeding capacity) thereof controlled by a control voltage output from the air conditioning controller 40.

When the air conditioning controller 40 actuates the high-temperature side coolant pump 21a, as indicated mainly by solid arrows in FIG. 1, the high-pressure side heat-medium circulation circuit 21 allows the coolant to circulate from the high-temperature side coolant pump 21a to the coolant passage of the high-temperature side coolant-refrigerant heat exchanger 12, the heater core 23, and the high-temperature side coolant pump 21a in this order. In this way, in the air-heating mode and the like, the coolant heated by the high-temperature side coolant-refrigerant heat exchanger 12 is allowed to flow into the heater core 23, thereby heating the ventilation air.

The low-pressure side heat-medium circulation circuit 22 is a heat-medium circulation circuit that allows for circulation of the coolant mainly between a radiator 24 and a coolant passage provided in an inverter Inv for supplying electric power to the traveling electric motor. The radiator 24 is disposed in the engine room. The radiator 24 is a heat exchanger for heat-medium radiation that exchanges heat between the coolant circulating through the low-pressure side heat-medium circulation circuit 22 and the outside air blown from the blower fan 14a, thereby dissipating heat from the coolant.

The inverter Inv is a vehicle-mounted device that operates while generating heat, and also serves as an external heat source for heating the coolant flowing into the radiator 24. The low-pressure side heat-medium circulation circuit 22 is provided with a low-temperature side coolant pump 22a that pressure-feeds, to the radiator 24, the coolant flowing out of the coolant passage provided in the inverter Inv. The low-temperature side coolant pump 22a has the substantially same basic structure as that of the high-temperature side coolant pump 21a.

When the air conditioning controller 40 actuates the low-temperature side coolant pump 22a, as indicated mainly by dashed arrows in FIG. 1, the low-pressure side heat-medium circulation circuit 22 allows the coolant to circulate from the low-temperature side coolant pump 22a to the coolant passage provided in the inverter Inv, the radiator 24, and the low-temperature side coolant pump 22a in this order.

Thus, when passing through the coolant passage, the coolant absorbs the waste heat from the inverter Inv, so that the heat absorbed by the coolant can be dissipated into the outside air while the coolant circulates through the radiator 24, thereby cooling the inverter Inv. In other words, the temperature of coolant flowing into the radiator 24 can be increased using the inverter Inv as the external heat source, thereby increasing the temperature of the outside air to be blown to the exterior heat exchanger 14.

The discharge port side of the high-temperature side coolant pump 21a in the high-pressure side heat-medium circulation circuit 21 is coupled to the suction port side of the low-temperature side coolant pump 22a in the low-pressure side heat-medium circulation circuit 22 via a first coupling flow path 25a. The outlet side of the radiator 24 in the low-pressure side heat-medium circulation circuit 22 is coupled to the inlet side of the coolant passage in the high-temperature side coolant-refrigerant heat exchanger 12 of the high-pressure side heat-medium circulation circuit 21 via a second coupling flow path 25b.

The first coupling flow path 25a is provided with a first coolant flow-rate adjustment valve 26a that adjusts the flow rate of coolant circulating through the first coupling flow path 25a. The second coupling flow path 25b is provided with a second coolant flow-rate adjustment valve 26b that adjusts the flow rate of coolant circulating through the second coupling flow path 25b.

Each of the first and second coolant flow-rate adjustment valves 26a and 26b is an electric flow-rate adjustment valve that includes a valve body capable of changing the opening degree, and an electric actuator capable of changing the opening degree by displacing the valve body. The first and second flow-rate adjustment valves 26a and 26b have their operations controlled by control signals output from the air conditioning controller 40.

Once the air conditioning controller 40 completely closes the first and second coolant flow-rate adjustment valves 26a and 26b, in the high-pressure side heat-medium circulation circuit 21, the coolant circulates between the heater core 23 and the high-temperature side coolant-refrigerant heat exchanger 12, while in the low-pressure side heat-medium circulation circuit 22, the coolant circulates between the radiator 24 and the inverter Inv. Thus, the coolant circulating through the high-pressure side heat-medium circulation circuit 21 does not mix with the coolant circulating through the low-pressure side heat-medium circulation circuit 22.

In contrast, once the air conditioning controller 40 opens the first and second coolant flow-rate adjustment valves 26a and 26b, depending on their opening degrees, a part of the coolant circulating through the high-pressure side heat-medium circulation circuit 21 flows into the low-pressure side heat-medium circulation circuit 22 via the first coupling flow path 25a, while a part of the coolant circulating through the low-pressure side heat-medium circulation circuit 22 flows into the high-pressure side heat-medium circulation circuit 21 via the second coupling flow path 25b.

More specifically, in the heat-medium circulation circuit 20, the first and second coolant flow-rate adjustment valves 26a and 26b can be opened to allow a part of the coolant exiting the heater core 23 to flow into the inverter Inv. The coolant exiting the inverter Inv is allowed to flow into the radiator 24, so that a part of the coolant flowing out of the radiator 24 can be returned to the coolant passage side of the high-temperature side coolant-refrigerant heat exchanger 12.

In other words, the air conditioning controller 40 adjusts the opening degree of the first and second coolant flow-rate adjustment valves 26a and 26b, thereby enabling adjustment of the flow rate of coolant flowing into the radiator 24 disposed in the low-pressure side heat-medium circulation circuit 22, in the coolant flowing out of the heater core 23 disposed in the high-pressure side heat-medium circulation circuit 21. Therefore, the first and second coolant flow-rate adjustment valves 26a and 26b constitute a heat-medium flow-rate adjustment device described in the accompanied claims.

Note that when the air conditioning controller 40 opens the first and second coolant flow-rate adjustment valves 26a and 26b, the flow rate of coolant flowing out of the high-pressure side heat-medium circulation circuit 21 into the low-pressure side heat-medium circulation circuit 22 sometimes transitionally differs from that of coolant returning from the low-pressure side heat-medium circulation circuit 22 to the high-pressure side heat-medium circulation circuit 21. However, both flow rates finally converge to the substantially same flow rate. In the description below, the flow rate after the convergence is referred to as a bypass flow rate.

Figure 2:
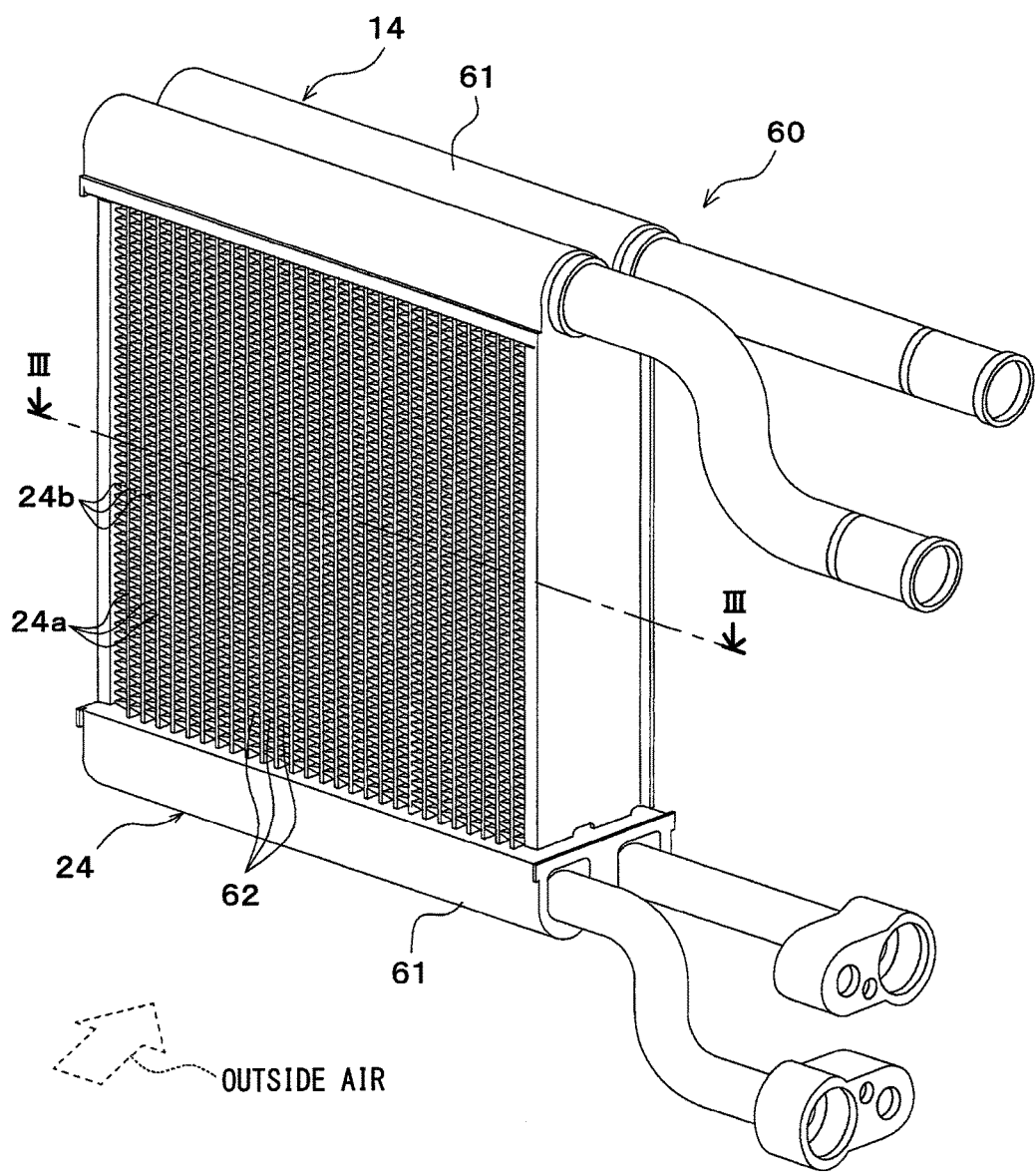
FIG. 2 is a perspective view of the outer appearance of a heat-exchanger structure in the first embodiment.
Figure 3:
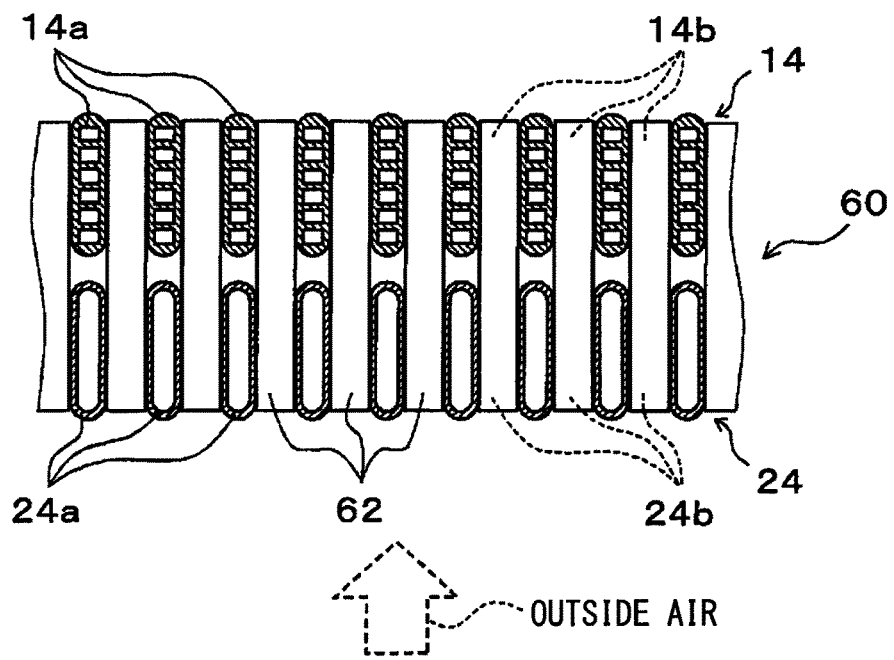
FIG. 3 is a cross-sectional view taken along the line III-III in FIG. 2.

Now, the detailed structure of the heat-exchanger structure 60 into which the exterior heat exchanger 14 and the radiator 24 are integrated will be described using FIGS. 2 and 3.

Each of the exterior heat exchanger 14 and the radiator 24 in this embodiment is configured as the so-called tank-and-tube heat exchanger that includes a plurality of tubes for circulation of the refrigerant or coolant and a pair of collecting-distributing tanks disposed on both ends of the tubes and adapted to collect and distribute the refrigerants or coolants circulating through the respective tubes.

More specifically, the exterior heat exchanger 14 includes a plurality of refrigerant tubes 14a that allows for circulation of the refrigerant therethrough. Further, as shown in the cross-sectional view of FIG. 3, the refrigerant tubes 14a each employ a porous flat tube having a flat sectional shape in the direction perpendicular to the longitudinal direction. The respective refrigerant tubes 14a are stacked with a predetermined spacing between flat surfaces of the outer surfaces opposed to each other in parallel.

Thus, in the surroundings of the refrigerant tube 14a, or between the adjacent refrigerant tubes 14a, a heat-absorption air passage 14b is formed to allow for circulation of the outside air blown from the blower fan 14a.

The radiator 24 includes a plurality of heat-medium tubes 24a that allows for circulation of the coolant therethrough. Further, as shown in the cross-sectional view of FIG. 3, each of the heat-medium tubes 24a employs a flat tube having a single pore and a flat sectional shape in the direction perpendicular to the longitudinal direction. Like the refrigerant tube 14a, the heat-medium tubes 24a are stacked with a predetermined spacing between flat surfaces of the outer surfaces opposed to each other in parallel.

Thus, in the surroundings of the heat-medium tube 24a, or between the adjacent heat-medium tubes 24a, a heat-dissipation air passage 24b is formed to allow for circulation of the outside air blown from the blower fan 14a.

In this embodiment, a collecting-distributing tank 61 for the exterior heat exchanger 14 is partially made of the same material as that of the collecting-distributing tank 61 for the radiator 24, and outer fins 62 formed of the same material are respectively disposed in the heat-absorption air passage 14b and the heat-dissipation air passage 24b. The outer fins 62 are bonded to both tubes 14a and 24a, whereby the exterior heat exchanger 14 and the radiator 24 are integrated together into the heat-exchanger structure 60.

Corrugated fins, which are formed by bending a metal thin plate with excellent thermal conductivity in a wave-like shape, are employed as the outer fins 62. A part of the outer fin 62 disposed in the heat-absorption air passage 14b serves to promote heat exchange between the refrigerant and outside air, while a part of the outer fin 62 disposed in the heat-dissipation air passage 24b serves to promote heat exchange between the coolant and outside air.

The outer fins 62 are bonded to both the refrigerant tubes 14a and the heat-medium tubes 24a, thereby enabling heat transfer between the refrigerant tubes 14a and the heat-medium tubes 24a. Thus, the exterior heat exchanger 14 and the radiator 24 are integrated together to enable heat transfer between the refrigerant circulating through the exterior heat exchanger 14 and the refrigerant circulating through the radiator 24.

That is, the heat-exchanger structure 60 of this embodiment has not only the function of exchanging heat between the refrigerant (first fluid) and the outside air (third fluid) and the function of exchanging heat between the coolant (second fluid) and the outside air (third fluid), but also the function of exchanging heat between the refrigerant (first fluid) and the coolant (second fluid).

Thus, the heat-exchanger structure 60 is configured as a composite heat exchanger or a three-fluid heat exchanger that can exchange heat among three types of fluids. The radiator 24 configures a heat-medium radiation portion that dissipates heat included in the coolant flowing out of the heater core 23, into a low-pressure refrigerant which circulates through a refrigerant flow path in a range from the outlet side of the heating expansion valve 13 to the suction port side of the compressor 11 at least in the air-heating mode.

In this embodiment described above, all of the refrigerant tube 14a of the exterior heat exchanger 14, the heat-medium tube 24a of the radiator 24, the collecting-distributing tank 61, the outer fin 62, and the like are formed of an aluminum alloy and integrated by brazing. Further, in this embodiment, the radiator 24 is integrated with the exterior heat exchanger 14 in such a manner as to be disposed on the windward side in the flow direction of the outside air blown by the blower fan 14a with respect to the exterior heat exchanger 14.

Next, the interior air conditioning unit 30 will be described below. The interior air conditioning unit 30 serves to blow out the ventilation air having its temperature adjusted by the heat pump system 1 into the vehicle compartment. The interior air conditioning unit 30 is disposed inside the dashboard (instrument panel) at the foremost part of the vehicle compartment. The interior air conditioning unit 30 accommodates a blower 32, the interior evaporator 17, the heater core 23, and the like in the casing 31 forming an outer envelope.

The casing 31 forms an air passage for ventilation air to be blown into the vehicle interior. The casing 31 is formed of resin (for example, polypropylene) with some elasticity and excellent strength. On the most upstream side of the ventilation air flow in the casing 31, an inside/outside air switch 33 is provided to serve as inside/outside air switching portion for switching between the inside air (air in the vehicle compartment) and the outside air (air outside the vehicle compartment) and introducing the air into the casing The inside/outside air switch 33 continuously adjusts opening areas of an inside air inlet for introducing the inside air into the casing 31 and an outside air inlet for introducing the outside air into the casing 31 by use of an inside/outside air switching door, thereby continuously changing a ratio of the volume of the inside air to the outside air. The inside/outside air switching door is driven by an electric actuator for the inside/outside air switching door. The electric actuator has its operation controlled by a control signal output from the air conditioning controller 40.

On the downstream side of ventilation air flow of the inside/outside air switch 33, the blowing device (blower) 32 is disposed as a blowing device for blowing air sucked thereinto via the inside/outside air switch 33, toward the vehicle interior. The blower 32 is an electric blower that drives a centrifugal multi-blade fan (sirocco fan) by an electric motor. The blower 32 has its number of revolutions (blowing volume) controlled by a control voltage output from the air conditioning controller 40.

The interior evaporator 17 and the heater core 23 are disposed on the downstream side of the ventilation air flow from the blower 32 in this order with respect to the flow of the ventilation air. A cool-air bypass passage 35 is formed in the casing 31 to allow the ventilation air having passed through the interior evaporator 17 to flow toward the downstream side while bypassing the heater core 23.

An air mix door 34 is disposed on the downstream side of the ventilation air flow in the interior evaporator 17 and on the upstream side of the ventilation air flow in the heater core 23. The air mix door 34 adjusts the rate of the volume of the air passing through the heater core 23 among the ventilation air having passed through the interior evaporator 17.

On the downstream side of the ventilation air flow of the heater core 23, a mixing space is provided to mix the ventilation air heated by the heater core 23 and the ventilation air passing through the cool-air bypass passage 35 and not heated by the heater core 23. Openings for blowing the ventilation air (conditioned air) mixed in the mixing space into the vehicle interior as a space to be air-conditioned are provided on the most downstream side of the ventilation air flow in the casing 31.

Specifically, the openings include a face opening for blowing the conditioned air toward the upper body of a passenger in the vehicle compartment, a foot opening for blowing the conditioned air toward the feet of the passenger, and a defroster air opening for blowing the conditioned air toward the inner side of a front glass of the vehicle (all the openings not being shown). A face air outlet, a foot air outlet, and a defroster air outlet (not shown) provided in the vehicle interior are connected to the downstream sides of the ventilation air flows from the face opening, foot opening, and defroster opening via respective ducts forming the air passages.

Thus, the air mix door 34 adjusts the ratio of the volume of air passing through the heater core 23 to that of air passing through the cool-air bypass passage 35 to thereby adjust the temperature of the conditioned air mixed in the mixing space, thus controlling the temperature of the ventilation air (conditioned air) blown from each air outlet into the vehicle interior.

That is, the air mix door 34 serves as a temperature adjustment device for adjusting the temperature of the conditioned air to be blown into the vehicle interior. The air mix door 34 is driven by an electric actuator for driving the air mix door. The electric actuator has its operation controlled by a control signal output from the air conditioning controller 40.

A face door for adjusting an opening area of the face opening is positioned on the upstream side of the ventilation air flow of the face opening; a foot door for adjusting an opening area of the foot opening is positioned on the upstream side of the ventilation air flow of the foot opening; and a defroster door for adjusting an opening area of the defroster opening is positioned on the upstream side of the ventilation air flow of the defroster opening (these doors being not shown).

The face door, foot door, and defroster door configure an opening mode switch for switching among opening modes. These doors are coupled to and rotate in cooperation with an electric actuator for driving the air outlet mode door via a link mechanism and the like. Note that the electric actuator has its operation controlled by a control signal output from the air conditioning controller 40.

The air outlet modes switched by the air outlet mode switch specifically include a face mode of blowing air from the face outlet toward an upper half of the body of a passenger in the vehicle interior by fully opening the face outlet; and a bi-level mode of blowing air toward the upper half of the body and the foot of the passenger in the vehicle by opening both the face outlet and foot outlet. The air outlet modes also include a foot mode of blowing air mainly from the foot outlet by fully opening the foot outlet while opening the defroster outlet only by a small opening degree; and a foot defroster mode of blowing air from both the foot outlet and the defroster outlet by opening the foot outlet and the defroster outlet to the same degree.

Further, a blowout mode selector switch provided in an operation panel is manually operated by the passenger, so that the defroster air outlet is fully opened to enable setting of a defroster mode of blowing air from the defroster air outlet toward the inner face of the front windowpane of the vehicle.

Next, the outline of an electric controller of this embodiment will be described below. The air conditioning controller 40 includes a well-known microcomputer, including a CPU, a ROM, a RAM, and the like, and its peripheral circuit. The air conditioning controller performs various computations and processing based on air-conditioning control programs stored in the ROM and controls the operations of various devices 11, 13, 14a, 16, 18a, 21a, 22a, 26a, 26b, 32, 34, and the like to be controlled that are connected to the output side of the controller.

A group of sensors for air-conditioning control is connected to the input side of the air conditioning controller 40 to input detection signals therefrom to the controller. The group of sensors includes an inside air sensor, an outside air sensor, a solar radiation sensor, a discharge temperature sensor, a discharge pressure sensor, an evaporator temperature sensor, a ventilation air temperature sensor, and an exterior-heat-exchanger temperature sensor. The inside air sensor serves as an inside-air-temperature detector that detects a vehicle interior temperature (inside air temperature) Tr. The outside air sensor serves as an outside-air-temperature detector that detects an exterior air temperature (outside air temperature) Tam. The solar radiation sensor serves as a solar-radiation amount detector that detects the solar radiation amount As of solar radiation to the vehicle interior. The discharge temperature sensor detects a discharge refrigerant temperature Td of the refrigerant discharged from the compressor 11. The discharge pressure sensor detects a discharge refrigerant pressure (high-pressure side refrigerant pressure) Pd of the refrigerant discharged from the compressor 11. The evaporator temperature sensor detects a refrigerant evaporation temperature (evaporator temperature) Tefin in the interior evaporator 17. The ventilation air temperature sensor detects a ventilation air temperature TAV of ventilation air to be blown from the mixing space into the vehicle interior. The exterior heat exchanger temperature sensor detects an exterior device temperature Ts of the exterior heat exchanger 14.

The evaporator temperature sensor of this embodiment is adapted to detect the temperature of a heat exchanging fin of the interior evaporator 17. However, the evaporator temperature sensor may adopt a temperature detector that detects the temperature of another part of the interior evaporator 17. Alternatively, the evaporator temperature sensor may adopt a temperature detector that detects the temperature of refrigerant circulating through the interior evaporator 17.

The external-heat-exchanger temperature sensor of this embodiment is adapted to detect the temperature of the refrigerant at the refrigerant outflow port of the exterior heat exchanger 14. However, the external-heat-exchanger temperature sensor may adopt a temperature detector that detects the temperature of another part of the exterior heat exchanger 14. Alternatively, the external-heat-exchanger temperature sensor may adopt a temperature detector that detects the temperature of refrigerant circulating through the exterior heat exchanger 14.

In this embodiment, the ventilation air temperature sensor is provided for detecting the ventilation air temperature TAV. Instead of this, the ventilation air temperature TAV for use may be a value calculated based on the evaporator temperature Tefin, the discharge refrigerant temperature Td, or the like.

The input side of the air conditioning controller 40 is connected to an operation panel (not shown) that is disposed near an instrument board at the front of the vehicle compartment. Operation signals from various operation switches provided on the operation panel are input to the input side of the air conditioning controller.

Specifically, various types of operation switches provided on the operation panel include an auto switch, an air-cooling switch, an air volume setting switch, a temperature setting switch, and a blowout mode selector switch. The auto switch is adapted to set or reset an automatic control operation of the vehicle air conditioner. The air-cooling switch is adapted to request the air-cooling of the vehicle interior. The air volume setting switch serves to manually set the volume of air from the blower 32. The temperature setting switch serves as a target temperature setting portion for setting a target temperature Tset of the vehicle interior. The blowout mode selector switch serves to manually set a blowout mode.

The air conditioning controller 40 of this embodiment is integrally structured with a control unit for controlling various devices of interest to be controlled which are connected to an output side of the controller. In the controller, a structure (hardware and software) adapted to control the operation of each of the devices to be controlled configures the control unit for controlling the operation of each device to be controlled.

For example, in the air conditioning controller 40, the structure (hardware and software) for controlling a refrigerant discharge capacity of the compressor 11 (the number of revolutions of the compressor 11) configures a discharge capacity control portion 40a, and the structure for controlling the operation of the heat-medium flow-rate adjustment device (in this embodiment, the first and second coolant flow-rate adjustment valves 26a and 26b) configures a heat-medium flow-rate control portion 40b. It is obvious that the discharge capacity control portion 40a, the heat-medium flow-rate control portion 40b, and the like may be configured as another separate controller with respect to the air conditioning controller 40.

Next, the operation of the above-mentioned structure in this embodiment will be described below. The heat pump system 1 of this embodiment can switch its operation among the air-cooling mode, the dehumidification heating mode, and the air-heating mode. Switching among these operation modes is performed by executing the air conditioning control program. The air conditioning control program is executed when the auto switch on the operation panel is turned on (ON).

More specifically, the main routine of the air conditioning control program involves reading detection signals from the above-mentioned sensor group for the air conditioning control as well as operation signals from the various air conditioning operation switches. A target blow-out temperature TAO which is a target temperature of air to be blown into the vehicle interior is calculated based on the following formula F1, based on the values of the detection signals and the operation signals read.

$$TAO = Kset \times Tset - Kr \times Tr - Kam \times Tam - Ks \times As + C \quad (F1)$$

where Tset is a target vehicle-interior temperature (preset vehicle-interior temperature) set by the temperature setting switch, Tr is a vehicle interior temperature (inside air temperature) detected by the inside air sensor, Tam is an outside air temperature detected by the outside air sensor, and As is an amount of solar radiation detected by the solar radiation sensor. The Kset, Kr, Kam, and Ks are control gains, and C is a constant for correction.

When the air cooling switch on the operation panel is turned on, and the target blow-out temperature TAO is lower than a predetermined reference air-cooling temperature a, the operation in the air-cooling mode is performed. When the air-cooling switch is turned on, and the target blow-out temperature TAO is equal to or higher than the reference air-cooling temperature a, the operation in the dehumidification heating mode is performed. When the air-cooling switch is not turned on, the operation in the air-heating mode is performed.

Thus, in the heat pump system 1 of this embodiment, when the outside air temperature is relatively high, mainly in summer, the operation in the air-cooling mode is performed, whereas mainly in early spring or early winter, the operation in the dehumidification heating mode is performed. Further, when the outside air temperature is relatively low, mainly in winter, the operation in the air-heating mode is performed. Further, in this embodiment, upon the end of the air-heating mode, the operation in an air-heating end mode is performed. Now, the operation of the heat pump system in each of the operation modes will be described.

(a) Air-Cooling Mode

In an air-cooling mode, the air conditioning controller 40 operates the high-temperature side coolant pump 21a and the low-temperature side coolant pump 22a so as to exhibit predetermined coolant pressure-feeding capacities thereof, thus completely closing the first and second coolant flow-rate adjustment valves 26a and 26b.

Thus, since in the heat-medium circulation circuit 20 of the air-cooling mode, the bypass flow rate becomes zero (0), the coolant circulating through the high-pressure side heat-medium circulation circuit 21 does not mix with the coolant circulating through the low-pressure side heat-medium circulation circuit 22, allowing the coolant to circulate through the respective heat-medium circulation circuits.

The air conditioning controller 40 fully opens the heating expansion valve 13, brings the cooling expansion valve 16 into a throttle state of exhibiting the decompression effect, and closes the heating on-off valve 18a.

Thus, in the heat pump cycle 10 of the air-cooling mode, as indicated by outlined arrows in FIG. 1, the vapor-compression refrigeration cycle is formed that allows the refrigerant to circulate through the compressor 11, the high-temperature side coolant-refrigerant heat exchanger 12 (the heating expansion valve 13), the exterior heat exchanger 14, the cooling expansion valve 16, the interior evaporator 17, the accumulator 19, and the compressor 11 in this order.

With this configuration of the heat-medium circulation circuit and refrigerant circuit, the air conditioning controller 40 determines the operating states of various devices to be controlled (control signals output to various devices to be controlled) based on the target blow-out temperature TAO, the detection signals from the sensor group, and the like.

For example, the refrigerant discharge capacity of the compressor 11, that is, the control signal to be output to the electric motor of the compressor 11 is determined in the following way. First, a target evaporator outlet temperature TEO of the interior evaporator 17 is determined based on the target blow-out temperature TAO with reference to the control map pre-stored in the air conditioning controller 40.

Specifically, the control map determines the target evaporator outlet temperature TEO to be decreased with decreasing target blow-out temperature TAO. Further, the target evaporator outlet temperature TEO is determined to be equal to or higher than a reference frost-formation preventing temperature (e.g., 1° C.), which is determined to be capable of suppressing the frost formation in the interior evaporator 17.

Then, a control signal to be output to the electric motor of the compressor 11 is determined based on a deviation between the target evaporator outlet temperature TEO and the evaporator temperature Tefin detected by the evaporator temperature sensor such that the evaporator temperature Tefin approaches the target evaporator outlet temperature TEO by the feedback control.

The control voltage to be output to the blower 32 is determined based on the target blow-out temperature TAO with reference to a control map pre-stored in the air conditioning controller 40. Specifically, in the control map, the volume of air blown from the blower 32 is maximized in an ultralow temperature range (maximum air-cooling region) and an ultrahigh temperature range (maximum air-heating region) of the target blow-out temperature TAO.

As the target blow-out temperature TAO increases from the ultralow temperature range to an intermediate temperature range, the volume of ventilation air is decreased with the increase in the target blow-out temperature TAO. As the target blow-out temperature TAO decreases from the ultrahigh temperature range to the intermediate temperature range, the volume of ventilation air is decreased with the decrease in the target blow-out temperature TAO. When the target blow-out temperature TAO enters a predetermined intermediate temperature range, the volume of ventilation air is minimized.

The control signal to be output to the electric actuator for driving the air mix door 34 is determined such that the air mix door 34 closes an air passage on the side of the heater core 23, and that the whole ventilation air having passed through the interior evaporator 17 flows while bypassing the heater core 23.

The control signal to be output to the cooling expansion valve 16 is determined with reference to the control map pre-stored in the air conditioning controller 40 such that a supercooling degree of the refrigerant flowing into the cooling expansion valve 16 approaches a target supercooling degree that is previously determined so as to substantially maximize a coefficient of performance (COP) of the heat pump cycle 10.

The control voltage to be output to the blower fan 14a is determined to make the blower fan 14a exhibit a blowing capacity previously set in accordance with the operation mode.

Then, the control signals or the like determined as mentioned above are output to various devices to be controlled. Then, a control routine is repeated until the operation of the vehicle air conditioner is requested to stop. The control routine involves reading the above-mentioned detection signal and operation signal, calculating the target blow-out temperature TAO, determining the operation state of each of various devices to be controlled, and outputting the control voltage and the control signal, for each predetermined control cycle. Such repetition of the control routine is also performed in other operation modes in the same way.

Thus, in the heat pump cycle 10 during the air-cooling mode, the high-pressure refrigerant discharged from the compressor 11 flows into the refrigerant passage of the high-temperature side coolant-refrigerant heat exchanger 12. At this time, when the temperature of the coolant flowing into the coolant passage of the high-temperature side coolant-refrigerant heat exchanger 12 is lower than that of the high-pressure refrigerant flowing into the high-temperature side coolant-refrigerant heat exchanger 12, the heat included in the high-pressure refrigerant is dissipated into the coolant, thereby heating the coolant circulating through the high-pressure side heat-medium circulation circuit 21.

Since in the air-cooling mode, the air mix door 34 closes the air passage of the heater core 23 side, the coolant circulating through the high-pressure side heat-medium circulation circuit 21 flows out of the heater core 23 without almost exchanging heat with the ventilation air, even if the refrigerant flows into the heater core 23. Thus, the temperature of coolant circulating through the high-pressure side heat-medium circulation circuit 21 increases to the substantially same as that of the high-pressure refrigerant, after start-up of the air-cooling mode.

When the temperature of coolant circulating through high-pressure side heat-medium circulation circuit 21 is increased to the substantially same level as that of the high-pressure refrigerant, the high-pressure refrigerant flows out of the high-temperature side coolant-refrigerant heat exchanger 12 without almost exchanging heat with the coolant, even if the refrigerant flows into the high-temperature side coolant-refrigerant heat exchanger 12.

The refrigerant exiting the refrigerant passage of the high-temperature side coolant-refrigerant heat exchanger 12 flows into the exterior heat exchanger 14 via the heating expansion valve 13 that is fully opened. The refrigerant flowing into the exterior heat exchanger 14 exchanges heat, at the exterior heat exchanger 14, with the outside air blown from the blower fan 14a and having passed through the radiator 24, thereby dissipating heat therefrom.

At this time, in the radiator 24, the coolant circulating through the low-pressure side heat-medium circulation circuit 22 exchanges heat with the outside air blown from the blower fan 14a, thereby dissipating heat from the coolant itself. More specifically, the radiator 24 dissipates heat absorbed from the inverter Inv into the outside air when the coolant circulates through the low-pressure side heat-medium circulation circuit 22.

As the heating on-off valve 18a is closed, the refrigerant flowing out of the exterior heat exchanger 14 flows into the cooling expansion valve 16 via the low-pressure side branch portion 15a to be decompressed into a low-pressure refrigerant. The refrigerant decompressed by the cooling expansion valve 16 flows into the interior evaporator 17 and absorbs heat from the ventilation air blown from the blower 32 to evaporate itself.

Thus, the ventilation air is cooled. The refrigerant flowing out of the interior evaporator 17 flows into the accumulator 19 via the merging portion 15b to be separated into liquid and gas phases. The gas-phase refrigerant separated by the accumulator 19 is drawn into the compressor 11 and compressed therein again.

As mentioned above, in the heat pump system 1 of the air-cooling mode, the ventilation air cooled by the interior evaporator 17 is blown into the vehicle interior, thereby enabling the air cooling of the vehicle interior.

The refrigerant circulating through the low-pressure side heat-medium circulation circuit 22 dissipates heat absorbed from the inverter Inv, into the outside air at the radiator 24, thereby enabling cooling of the inverter Inv. This is effective under operating conditions where the outside air temperature is relatively high, and the temperature of the inverter Inv tends to increase, like in summer when the operation mainly in the air-cooling mode is carried out.

(b) Dehumidification Heating Mode

In a dehumidification heating mode, the air conditioning controller 40 operates the high-temperature side coolant pump 21a and the low-temperature side coolant pump 22a so as to exhibit predetermined coolant pressure-feeding capacities thereof, thus completely closing the first and second coolant flow-rate adjustment valves 26a and 26b in the same way as in the air cooling mode.

Thus, since in the heat-medium circulation circuit 20 of the air-cooling mode, the bypass flow rate becomes zero (0), the coolant circulating through the high-pressure side heat-medium circulation circuit 21 does not mix with the coolant circulating through the low-pressure side heat-medium circulation circuit 22, allowing the coolant to circulate through the respective heat-medium circulation circuits.

The air conditioning controller 40 brings the heating expansion valve 13 into a throttle state, fully opens the cooling expansion valve 16, and closes the heating on-off valve 18a.

In this way, in the heat pump cycle 10 of the dehumidification heating mode, as indicated by diagonal hatched arrows in FIG. 1, a vapor-compression refrigeration cycle is configured that allows the refrigerant to circulate through the compressor 11, the high-temperature side coolant-refrigerant heat exchanger 12, the heating expansion valve 13, the exterior heat exchanger 14, (the cooling expansion valve 16), the interior evaporator 17, the accumulator 19, and the compressor 11 in this order. That is, in the dehumidification heating mode, the refrigeration cycle is configured to allow the refrigerant to circulate through the components thereof in the substantially same order as in the air-cooling mode.

With such a configuration of the heat-medium circulation circuit and the refrigerant circuit, the air conditioning controller 40 determines the operating states of various devices to be controlled (control signals output to various devices to be controlled) based on the target blow-out temperature TAO, the detection signals from the sensor group, and the like.

For example, the control signal to be output to the electric motor of the compressor 11, the control voltage to be output to the blower 32, and the control voltage to be output to the blower fan 14a are determined in the same way as that in the air-cooling mode.

The control signal to be output to the heating expansion valve 13 is determined such that a supercooling degree of the refrigerant flowing into the heating expansion valve 13 approaches a target supercooling degree that is previously defined to substantially maximize the COP. A control signal to be output to the electric actuator for driving the air mix door 34 is determined such that the ventilation air temperature TAV approaches the target blow-out temperature TAO.

Thus, in the heat pump cycle 10 during the dehumidification heating mode, the high-pressure refrigerant discharged from the compressor 11 flows into the high-temperature side coolant-refrigerant heat exchanger 12. In this way, the coolant circulating through the high-pressure side heat-medium circulation circuit 21 is heated.

Since in the dehumidification heating mode, the air mix door 34 opens the air passage on the side of the heater core 23, the coolant heated by the high-temperature side coolant-refrigerant heat exchanger 12 flows into the heater core 23, whereby part of the ventilation air after passing through the interior evaporator 17 is heated. In this way, the temperature of the ventilation air blown from the mixing space in the interior air conditioning unit 30 toward the vehicle interior approaches the target blow-out temperature TAO.

The refrigerant flowing out of the refrigerant passage in the high-temperature side coolant-refrigerant heat exchanger 12 flows into the heating expansion valve 13 to be decompressed into a low-pressure refrigerant. The low-pressure refrigerant decompressed by the heating expansion valve 13 flows into the exterior heat exchanger 14. The refrigerant flowing into the exterior heat exchanger 14 absorbs heat from the outside air blown from the blower fan 14a and having passed through the radiator 24 to evaporate at the exterior heat exchanger 14.

At this time, in the radiator 24, the refrigerant circulating through the low-pressure side heat-medium circulation circuit 22 exchanges heat with the outside air blown from the blower fan 14a to dissipate heat from the refrigerant, like in the air-cooling mode.

As the heating on-off valve 18a is closed, the refrigerant exiting the exterior heat exchanger 14 flows into the interior evaporator 17 via the low-pressure side branch portion 15a and the cooling expansion valve 16 that is fully opened. The refrigerant flowing into the interior evaporator 17 further absorbs heat from the ventilation air blown from the blower 32 to evaporate itself. In this way, the ventilation air is cooled, thereby achieving the dehumidification of the ventilation air. The operations following this step will be the same as those in the air-cooling mode.

As mentioned above, in the heat pump system 1 of the dehumidification heating mode, the ventilation air cooled and dehumidified by the interior evaporator 17 is heated by the heater core 23 again to be blown into the vehicle interior, thereby enabling the dehumidification heating of the vehicle interior. Further, the refrigerant circulating through the low-pressure side heat-medium circulation circuit 22 dissipates heat absorbed from the inverter Inv, into the outside air and the like at the radiator 24, thereby enabling cooling of the inverter Inv.

This embodiment employs the heat-exchanger structure 60 that includes the exterior heat exchanger 14 and the radiator 24, which are integrated together, so that the heat included in the coolant circulating through the radiator 24 can be transferred to the refrigerant circulating through the exterior heat exchanger 14. Thus, the waste heat of the inverter Inv absorbed by the coolant can be effectively used as a heat source for reheating the dehumidified ventilation air.

Since in the heat pump system 1 of the dehumidification heating mode, the first and second coolant flow-rate adjustment valves 26a and 26b are completely closed, the coolant circulating through the high-pressure side heat-medium circulation circuit 21 does not mix with the coolant circulating through the low-pressure side heat-medium circulation circuit 22. Thus, in the dehumidification heating mode, the heat stored in the coolant circulating through the high-pressure side heat-medium circulation circuit 21 can be used to reheat the dehumidified ventilation air, for example, even if the outside air temperature is lowered, reducing the amount of heat absorbed by the refrigerant at the exterior heat exchanger 14.

(d) Air-Heating Mode

In an air-heating mode, the air conditioning controller 40 operates the high-temperature side coolant pump 21a and the low-temperature side coolant pump 22a so as to exhibit predetermined coolant pressure-feeding capacities thereof, thus opening the first and second coolant flow-rate adjustment valves 26a and 26b.

Thus, the heat-medium circulation circuit 20 in the air-heating mode allows the coolant to circulate through the respective heat-medium circulation circuits 21 and 22. Additionally, the heat-medium circulation circuit 20 allows a part of the coolant circulating through the high-pressure side heat-medium circulation circuit 21 to flow into the low-pressure side heat-medium circulation circuit 22 via the first coupling flow path 25a, as well as a part of the coolant circulating through the low-pressure side heat-medium circulation circuit 22 to return to the high-pressure side heat-medium circulation circuit 21 via the second coupling flow path 25b.

The air conditioning controller 40 brings the heating expansion valve 13 into a throttle state, completely closes the cooling expansion valve 16, and opens the heating on-off valve 18a.

In this way, in the heat pump cycle 10 of the air-heating mode, as indicated by black arrows in FIG. 1, a vapor-compression refrigeration cycle is configured that allows the refrigerant to circulate through the compressor 11, the high-temperature side coolant-refrigerant heat exchanger 12, the heating expansion valve 13, the exterior heat exchanger 14, the accumulator-side passage 18, the accumulator 19, and the compressor 11 in this order.

With such a configuration of the heat-medium circulation circuit and the refrigerant circuit, the air conditioning controller 40 determines the operating states of the respective devices to be controlled (control signals output to various devices to be controlled) based on the target blow-out temperature TAO, the detection signals from the sensor group, and the like.

For example, the refrigerant discharge capacity of the compressor 11, that is, the control signal to be output to the electric motor of the compressor 11 is determined in the following way. First, a target condensation temperature TCO of the high-temperature side coolant-refrigerant heat exchanger 12 is determined based on the target blow-out temperature TAO with reference to the control map pre-stored in the air conditioning controller 40. Specifically, the control map determines the target condensation temperature TCO such that the target condensation temperature TCO increases with increasing target blow-out temperature TAO.

Then, the control signal to be output to the electric motor of the compressor 11 is determined in such a manner as to make the discharge refrigerant temperature Td approach the target condensation temperature TCO using the feedback control method and further to suppress abnormal increase in high-pressure side refrigerant pressure Pd, based on a deviation between the target condensation temperature TCO and the discharge refrigerant temperature Td detected by the discharge temperature sensor.

For example, the control voltage to be output to the blower 32 and the control voltage to be output to the blower fan 14a are determined in the same way as that in the air cooling mode. The control signal to be output to the heating expansion valve 13 is determined in the same way as in the dehumidification heating mode.

The control signal to be output to the electric actuator of the air mix door 34 is determined such that the air mix door 34 closes the cool-air bypass passage 35, and that the whole ventilation air having passed through the interior evaporator 17 can pass through the air passage of the heater core 23 side.

The control signals to be output to the first and second coolant flow-rate adjustment valves 26a and 26b determine the target bypass flow rate at which the coolant flows from the high-pressure side heat-medium circulation circuit 21 to the low-pressure side heat-medium circulation circuit 22, that is, at which the coolant is returned from the low-pressure side heat-medium circulation circuit 22 to the high-pressure side heat-medium circulation circuit 21, based on the target blow-out temperature TAO with reference to the control map pre-stored in the air conditioning controller 40.

Figure 4:
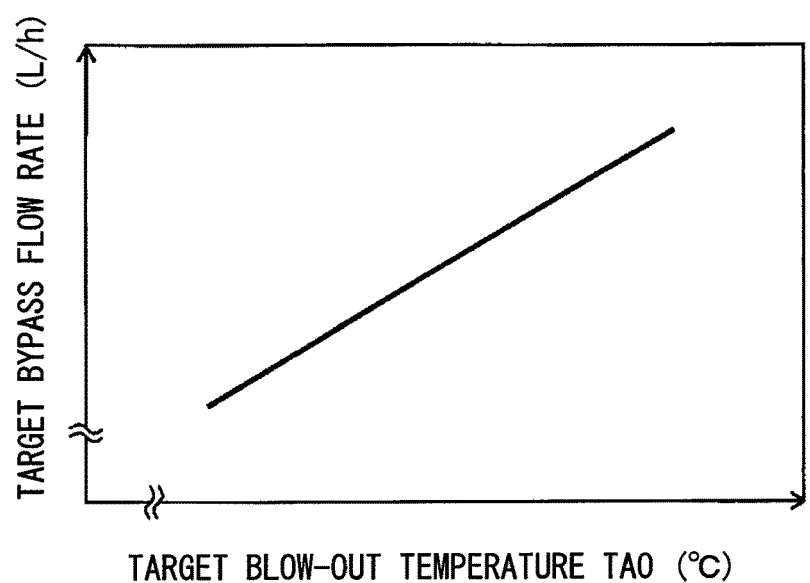
FIG. 4 is a control characteristic diagram showing the relationship between a target blow-out temperature TAO and a bypass flow rate.

Specifically, as shown in FIG. 4, the control map determines the target bypass flow rate such that the target bypass flow rate increases with increasing target blow-out temperature TAO. To obtain the determined target bypass flow rate, the control signals to be output to the first and second coolant flow-rate adjustment valves 26a and 26b are determined.

Here, the above-mentioned target blow-out temperature TAO is determined such that an actual vehicle interior temperature is kept at the preset vehicle-interior temperature Tset corresponding to a passenger's desired temperature. Thus, in the heat pump cycle 10 for heating the ventilation air by use of the coolant heated by the high-temperature side coolant-refrigerant heat exchanger 12 as a heat source, like in the air-heating mode of this embodiment, the heating capacity for the ventilation air that is required for the heat pump cycle 10 is increased with increasing target blow-out temperature TAO.

That is, in this embodiment, the heat-medium flow-rate control portion 40b controls the operations of the first and second coolant flow-rate adjustment valves 26a and 26b such that the bypass flow rate of coolant flowing out of the high-pressure side heat-medium circulation circuit 21 to the low-pressure side heat-medium circulation circuit 22 (that is, the bypass flow rate of coolant returning from the low-pressure side heat-medium circulation circuit 22 to the high-pressure side heat-medium circulation circuit 21) increases with increasing heating capacity for the ventilation air that is required for the heat pump cycle 10.

Thus, in the heat pump cycle 10 during the air-heating mode, like the dehumidification heating mode, the high-pressure refrigerant discharged from the compressor 11 flows into the high-temperature side coolant-refrigerant heat exchanger 12, thereby heating the coolant circulating through the high-pressure side heat-medium circulation circuit 21. Further, since in the heating mode, the air mix door 34 fully opens the air passage on the side of the heater core 23, the heated warm water flows into the heater core 23, whereby the ventilation air after passing through the interior evaporator 17 is heated.

The refrigerant flowing out of the high-temperature side coolant-refrigerant heat exchanger 12 flows into the heating expansion valve 13 to be decompressed into a low-pressure refrigerant. The low-pressure refrigerant decompressed by the heating expansion valve 13 flows into the exterior heat exchanger 14. The refrigerant flowing into the exterior heat exchanger 14 absorbs heat, at the exterior heat exchanger 14, from the outside air blown from the blower fan 14a and having passed through the radiator 24, thus evaporating itself.

At this time, in the radiator 24, the refrigerant circulating through the low-pressure side heat-medium circulation circuit 22 exchanges heat with the outside air blown from the blower fan 14a, thereby dissipating heat from the refrigerant itself.

As the heating on-off valve 18a is open, the refrigerant flowing out of the exterior heat exchanger 14 flows into the accumulator 19 via the low-pressure side branch portion 15a and the accumulator-side passage 18 to be separated into gas and liquid phase refrigerants. The vapor-phase refrigerant separated by the accumulator 19 is sucked into the compressor 11 and decompressed again, like in the air-cooling mode and the dehumidification heating mode.

Since in the heat-medium circulation circuit 20 of the air-heating mode, the first and second coolant flow-rate adjustment valves 26a and 26b are opened, a part of the coolant flowing out of the heater core 23 in the high-pressure side heat-medium circulation circuit 21 flows into the inverter Inv in the low-pressure side heat-medium circulation circuit 22. The coolant exiting the inverter Inv is allowed to flow into the radiator 24, so that a part of the coolant flowing out of the radiator 24 is returned to the coolant passage of the high-temperature side coolant-refrigerant heat exchanger 12 in the high-pressure side heat-medium circulation circuit 21.

As mentioned above, in the heat pump system 1 of the air-heating mode, the ventilation air heated by the heater core 23 is blown into the vehicle interior, thereby enabling the air heating of the vehicle interior.

Further, this embodiment employs the heat-exchanger structure 60 that includes the exterior heat exchanger 14 and the radiator 24, which are integrated together, so that the heat included in the coolant circulating through the radiator 24 can be transferred to the refrigerant circulating through the exterior heat exchanger 14. Thus, the waste heat absorbed by the coolant from the inverter Inv can be effectively used as a heat source for heating the ventilation air.

(d) Air-Heating End Mode

The air-heating end mode is an operation mode executed at the end of the air-heating mode, that is, an operation mode executed when heating of the ventilation air by the heat pump cycle 10 is requested to stop. In this embodiment, the operation in the air-heating end mode is performed until a predetermined time has elapsed after an auto switch on the operation panel is turned OFF by the passenger during the air-heating mode.

In the air-heating end mode, the air conditioning controller 40 stops the operations of the compressor 11 and the blower 32. Thus, in the air-heating end mode, the heat pump cycle 10 does not exhibit the function of adjusting the temperatures of the coolant and the ventilation air. Further, the air conditioning controller 40 operates the high-temperature side coolant pump 21a and the low-temperature side coolant pump 22a so as to exhibit predetermined coolant pressure-feeding capacities thereof, thus fully opening the first and second coolant flow-rate adjustment valves 26a and 26b.

Thus, in the heat-medium circulation circuit 20 of the air-heating end mode, like the air heating mode, a part of the coolant circulating through the high-pressure side heat-medium circulation circuit 21 is allowed to flow into the low-pressure side heat-medium circulation circuit 22, while a part of the coolant circulating through the low-pressure side heat medium circulation circuit 22 is returned to the high-pressure side heat-medium circulation circuit 21. At this time, in the air-heating end mode, the first and second coolant flow-rate adjustment valves 26a and 26b are fully opened, whereby the bypass flow rate is increased more than that in the air-heating mode.

That is, the air-heating end mode increases the flow rate of coolant flowing into the radiator 24 disposed in the low-pressure side heat-medium circulation circuit 22, in the high-temperature coolant flowing out of the heater core 23, compared to in the air-heating mode. Thus, in the air-heating end mode, the temperature of coolant circulating through the low-pressure side heat-medium circulation circuit 22 can be increased more than that in the air-heating mode.

Accordingly, in the air-heating end mode, frost can be removed with heat included in the coolant circulating through the radiator 24, even if the frost is formed at the exterior heat exchanger 14 immediately before the end of the air-heating mode.

In the vehicle air conditioner of this embodiment, the heat pump system 1 operates in the way described above and thus can perform the air-cooling, dehumidification heating, and air-heating operations of the vehicle interior. Further, the heat pump system 1 of this embodiment can exhibit excellent effects during the air-heating mode and the air-heating end mode as described later.

Here, the air-heating mode is generally an operation mode performed when the outside air temperature becomes relatively low, like in winter. Thus, in the air-heating mode, the refrigerant evaporation temperature tends to decrease in the exterior heat exchanger 14 of the heat pump cycle 10. Once the refrigerant evaporation temperature in the exterior heat exchanger 14 is reduced to 0° C. or lower, frost might sometimes be generated at the exterior heat exchanger 14.

Such formation of frost would close a heat-absorption air passage 14b of the exterior heat exchanger 14 with the frost, drastically degrading the heat exchange performance of the exterior heat exchanger 14. Thus, in the air-heating mode, any means can be considered to be taken for suppressing frost formation at the exterior heat exchanger 14, using waste heat from the inverter Inv. Likewise, in the air-heating end mode, any means can be considered to be taken for defrosting the exterior heat exchanger 14, using waste heat from the inverter Inv.

However, the waste heat from the inverter Inv changes depending on the traveling state of the vehicle. For this reason, in the structure that removes the frost or suppresses the frost formation at the exterior heat exchanger 14 with heat supplied from the external heat source, like the inverter Inv, the heat required to defrost or suppress the frost formation at the exterior heat exchanger 14 might fail to be sufficiently ensured depending on the operating state of the external heat source.

In contrast, the heat pump system 1 of this embodiment includes the radiator 24 as the heat-medium radiation portion, so that heat included in the coolant circulating through the heat-medium circulation circuit 20 can be dissipated into the low-pressure refrigerant in the heat pump cycle 10.

Thus, in the air-heating mode, the refrigerant evaporation temperature at the exterior heat exchanger 14 can be increased, thereby suppressing the frost formation at the exterior heat exchanger 14, regardless of the operating state of the inverter Inv as the external heat source. In the air-heating end mode, the frost can be removed with heat transferred from the coolant to the exterior heat exchanger 14, regardless of the operating state of the inverter Inv as the external heat source.

The radiator 24 dissipates heat included in the coolant flowing out of the heater core 23 into the outside air and the exterior heat exchanger 14, so that the heat of the coolant heated by the high-temperature side coolant-refrigerant heat exchanger 12 can be used to heat the ventilation air, while excessive heat can also be used to defrost or suppress the frost formation at the exterior heat exchanger 14. Thus, the suppression of frost formation at the exterior heat exchanger 14 can be achieved without increasing an energy consumption of the compressor 11.

That is, the heat pump system 1 of this embodiment can achieve the defrosting of the exterior heat exchanger 14 or the suppression of frost formation at the exterior heat exchanger 14 without depending on heat supplied from the external heat source or the like and without increasing the energy consumption of the compressor 11.

The heat pump system 1 of this embodiment employs the heat-exchanger structure 60, so that the heat included in the coolant circulating through the radiator 24 as the heat exchanger for heat-medium radiation can be directly transferred to the exterior heat exchanger 14, thereby effectively achieving the suppression of the frost formation or defrosting of the exterior heat exchanger 14.

The heat pump system 1 of this embodiment includes the first and second coolant flow-rate adjustment valves 26a and 26b serving as the heat-medium flow-rate adjustment device, which can adjust the amount of heat dissipated from the coolant into the low-pressure refrigerant as appropriate.

Specifically, in the air-heating mode, the flow rate of coolant exiting the heater core 23 and flowing into the radiator 24 is increased with increasing heating capacity for the ventilation air that is required for the heat pump cycle 10. Thus, in the air-heating mode, the temperature of coolant circulating through the low-pressure side heat-medium circulation circuit 22 is increased with decreasing refrigerant evaporation temperature at the exterior heat exchanger 14, thereby effectively achieving the suppression of the frost formation of the exterior heat exchanger 14.

In the air-heating end mode, the flow rate of coolant exiting the heater core 23 and flowing into the radiator 24 is increased when the heat pump cycle 10 is requested to stop heating of the ventilation air. Thus, in the air-heating end mode, the defrosting of the exterior heat exchanger 14 can be performed quickly after the end of the air-heating operation of the vehicle interior.

Second Embodiment

Figure 5:
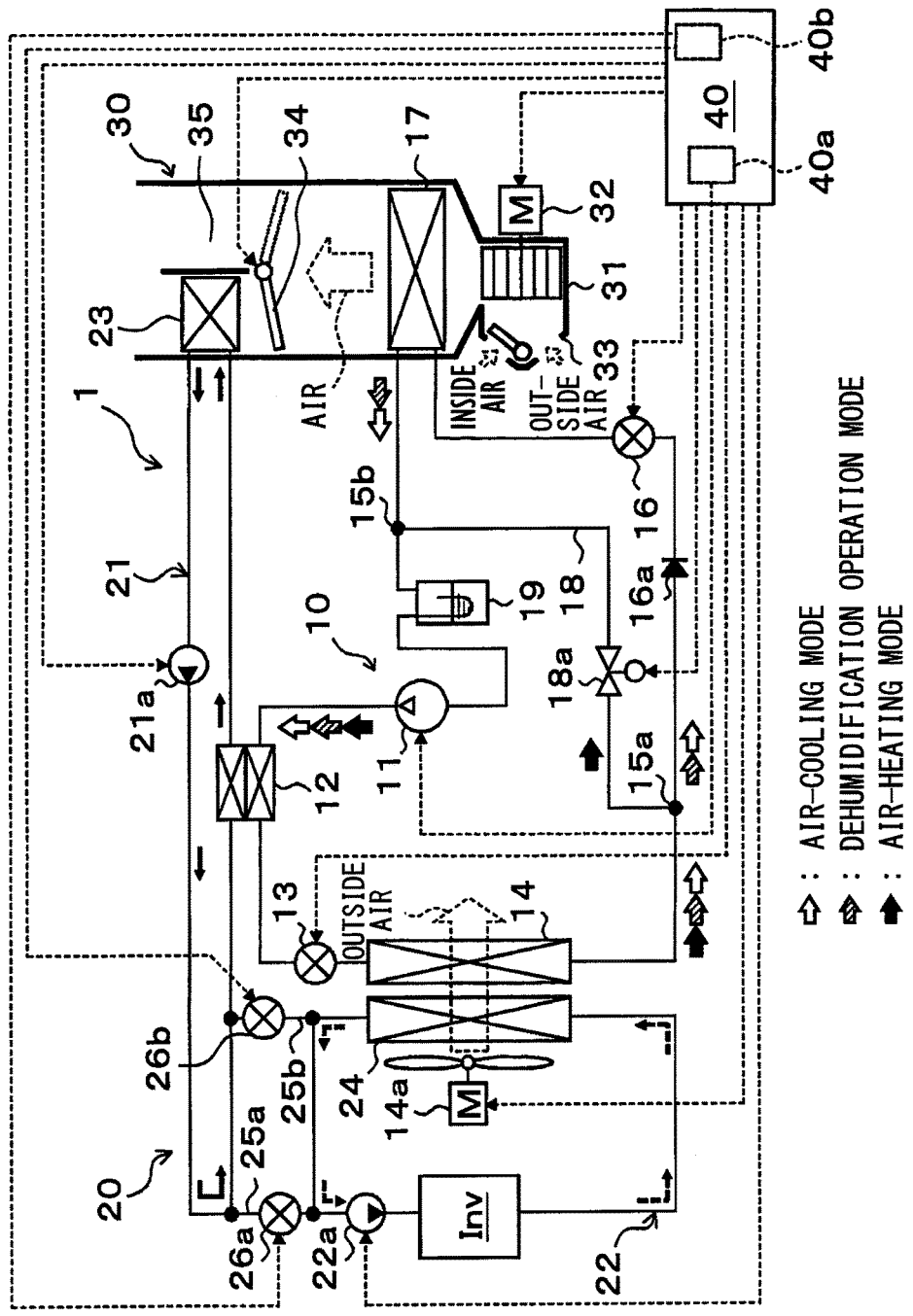
FIG. 5 is a schematic entire configuration diagram of a heat pump system according to a second embodiment.

Although as described in the first embodiment, the exterior heat exchanger 14 and the radiator 24 are integrated together into the heat-exchanger structure 60 by way of example, in this embodiment as shown in the entire configuration diagram of FIG. 5, the exterior heat exchanger 14 and the radiator 24 are individually formed of separate heat exchangers. Referring to FIG. 5, the same or equivalent parts as those described in the first embodiment are designated by the same reference numerals. The same goes for the following figures.

The exterior heat exchanger 14 of this embodiment is disposed to exchange heat between the refrigerant circulating therethrough and the outside air blown from the blower fan 14a and having passed through the radiator 24. That is, the exterior heat exchanger 14 is disposed downstream of the outside air flow blown from the blower fan 14a, rather than the radiator 24. The structures and operations of other components of the heat pump system 1 except for the above points are the same as those in the first embodiment.

Thus, even the operation of the heat pump system 1 in this embodiment can perform the air-cooling, dehumidification heating, and air-heating of the vehicle interior, thereby obtaining the substantially same effects as those of the first embodiment.

More specifically, in this embodiment, the outside air blown from the blower fan 14a is allowed to flow from the radiator 24 to the exterior heat exchanger 14, so that the heat included in the coolant circulating through the radiator 24 can be indirectly transferred to the refrigerant circulating through the exterior heat exchanger 14 via the outside air. Thus, in the dehumidification heating mode, the waste heat of the inverter Inv absorbed by the coolant can be effectively used as a heat source for reheating the dehumidified ventilation air.

In the air-heating mode, like the first embodiment, the heat included in the coolant circulating through the heat-medium circulation circuit 20 can be effectively used as the heat source for heating the ventilation air, and also used to suppress the frost formation at the exterior heat exchanger 14, regardless of the operating state of the inverter Inv. In the air-heating end mode, like the first embodiment, the heat included in the coolant circulating through the heat-medium circulation circuit 20 can be used to defrost the exterior heat exchanger 14, regardless of the operating state of the inverter Inv.

Further, in this embodiment, the exterior heat exchanger 14 and the radiator 24 are individually formed of separate heat exchangers, so that the defrosting or suppression of the frost formation of the exterior heat exchanger 14 can be easily achieved without using a complex heat exchanger structure.

Third Embodiment

Figure 6:
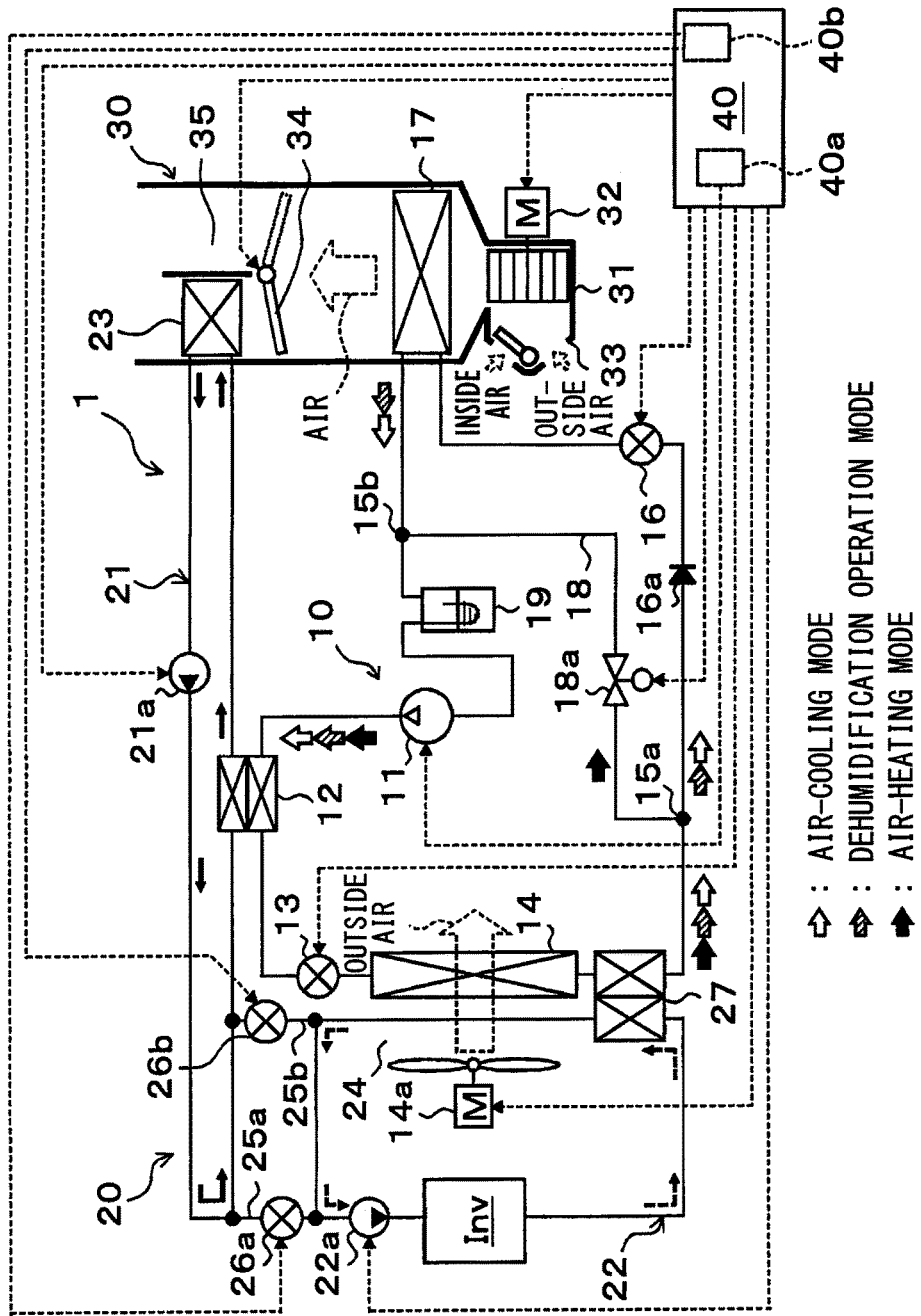
FIG. 6 is a schematic entire configuration diagram of a heat pump system according to a third embodiment.

In this embodiment, compared to the second embodiment, as shown in the entire configuration diagram of FIG. 6, a low-temperature side coolant-refrigerant heat exchanger 27 is employed, instead of the radiator 24, to exchange heat between the coolant circulating through the heat-medium circulation circuit 20 (specifically, the low-pressure side heat-medium circulation circuit 22) and the low-pressure refrigerant (specifically, the refrigerant flowing out of the exterior heat exchanger 14) by way of example.

The low-temperature side coolant-refrigerant heat exchanger 27 has the substantially same basic structure as that of the high-temperature side coolant-refrigerant heat exchanger 12. In this embodiment, the low-temperature side coolant-refrigerant heat exchanger 27 configures a heat exchanger for heat-medium radiation that exchanges heat between the low-pressure refrigerant and the coolant flowing out of the heater core 23. The structures of other components of the heat pump system 1 except for the above points are the same as those in the first embodiment.

In the heat pump system 1 of this embodiment, the operation in the air-heating end mode is not performed. The other operations of the heat pump system 1 except for the above points are the same as those in the first embodiment. Thus, even the operation of the heat pump system 1 in this embodiment can perform the air-cooling, dehumidification heating, and air-heating of the vehicle interior, thereby obtaining the substantially same effects as those of the first embodiment.

More specifically, in the dehumidification heating mode of this embodiment, the low-temperature side coolant-refrigerant heat exchanger 27 enables the heat of the coolant circulating through the low-temperature side coolant-refrigerant heat exchanger 27 to be absorbed in the low-pressure refrigerant. Thus, in the dehumidification heating mode, the waste heat from the inverter Inv absorbed by the coolant can be effectively used as a heat source for reheating the dehumidified ventilation air.

In the air-heating mode, like the first embodiment, the heat included in the coolant circulating through the heat-medium circulation circuit 20 can be effectively employed as the heat source for heating the ventilation air, and also used to suppress the frost formation at the exterior heat exchanger 14, regardless of the operating state of the inverter Inv.

Note that although the low-temperature side coolant-refrigerant heat exchanger 27 of this embodiment allows the coolant flowing out of the inverter Inv to exchange heat with the low-pressure refrigerant flowing out of the exterior heat exchanger 14, obviously, the coolant may exchange heat with a low-pressure refrigerant circulating through other parts. For example, the coolant flowing out of the inverter Inv may exchange heat with the low-pressure refrigerant circulating through the refrigerant flow path leading from the outlet side of the heating expansion valve 13 to the refrigerant inlet side of the exterior heat exchanger 14.

Fourth to Sixth Embodiments

Figure 7:
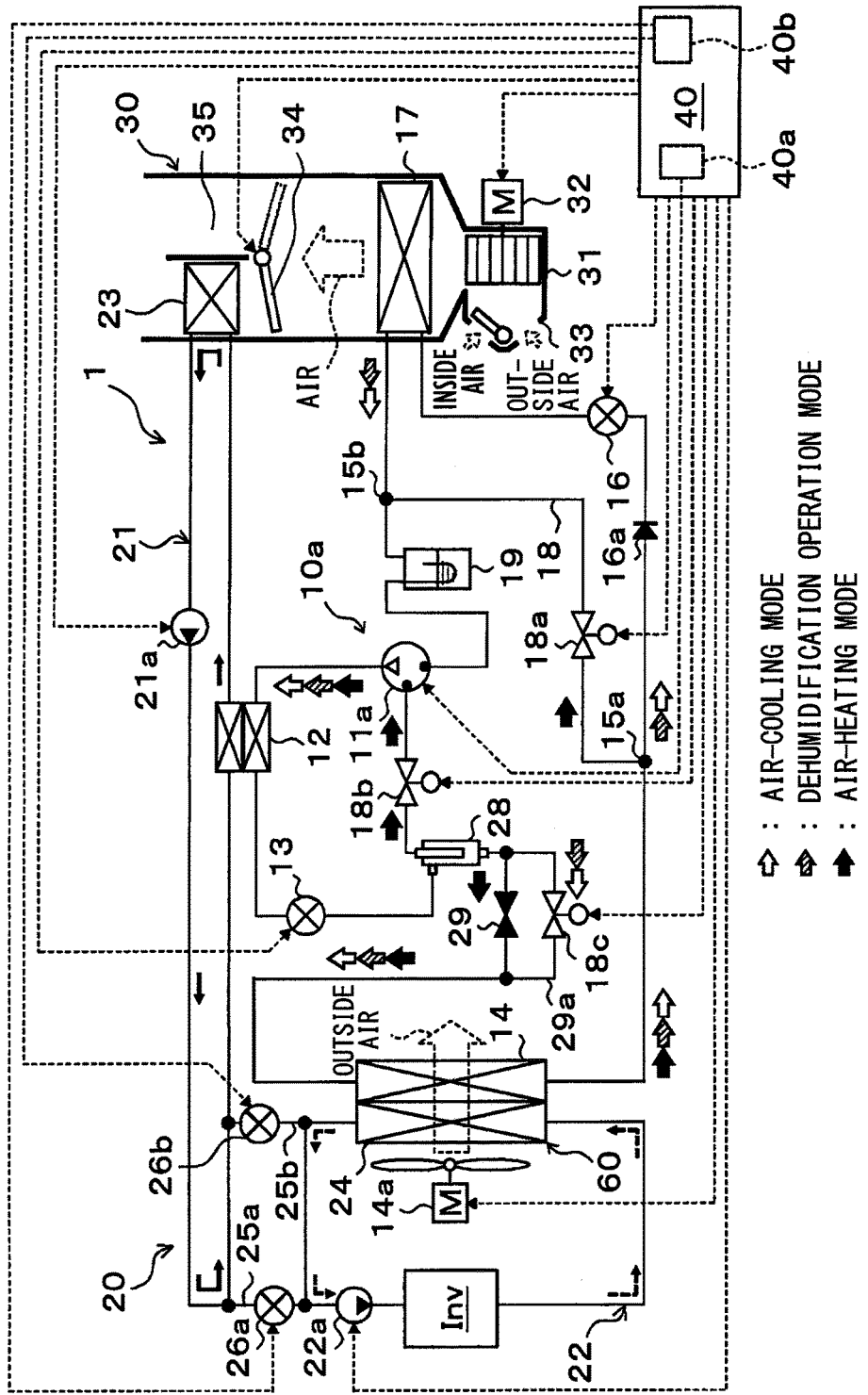
FIG. 7 is a schematic entire configuration diagram of a heat pump system according to a fourth embodiment.

As shown in the entire configuration diagram of FIG. 7, as compared to the first embodiment, a fourth embodiment employs a heat pump cycle 10a in place of the heat pump cycle 10, by way of example, that is capable of switching to a refrigerant circuit configuring a gas injection cycle (economizer refrigeration cycle) at least in the air-heating mode.

More specifically, in the heat pump cycle 10a of this embodiment, the compressor 11a is configured as the two-stage booster electric compressor that accommodates in a housing forming an outer envelope, two compression mechanisms including a low-stage side compression mechanism and a high-stage side compression mechanism, and an electric motor rotatable driving both the compression mechanisms.

The compressor 11a of this embodiment is provided with a suction port for drawing the low-pressure refrigerant from the outside into the low-stage side compression mechanism, and a discharge port for discharging the high-pressure refrigerant discharged from the high-stage side compression mechanism to the outside of the housing. Additionally, the compressor 11a is also provided with an intermediate-pressure suction port that allows an intermediate-pressure refrigerant generated in the cycle to flow thereinto from the outside and to be merged with the refrigerant being compressed from a low pressure into a high pressure.

Further, the intermediate-pressure suction port is connected to the refrigerant discharge port side of the low-stage side compression mechanism (that is, the refrigerant suction port side of the high-stage side compression mechanism). The low-stage side compression mechanism and the high-stage side compression mechanism can employ various types of compression mechanisms, such as a scroll type compression mechanism, a vane compression mechanism, and a rolling piston compression mechanism.

Although this embodiment employs the compressor 11a accommodating the two compression mechanisms in one housing, the form of the compressor is not limited thereto. That is, as long as the intermediate-pressure refrigerant can flow from the intermediate-pressure suction port to be merged with the refrigerant being compressed from the low pressure to the high pressure, the compressor may be an electric compressor that accommodates within a housing, one fixed displacement compression mechanism, and an electric motor for rotatably driving the compression mechanism.

Alternatively, one two-stage booster compressor may be comprised of two compressors, namely, a low-stage side-compression device and a high-stage sidecompression device, which are connected in series. A suction port of the low-stage sidecompression device placed on a low-stage side is defined as the suction port of the entire two-stage booster compressor. A discharge port of the high-stage sidecompression device placed on a high-stage side is defined as the discharge port of the entire two-stage booster compressor. An intermediate pressure suction port is provided at a connection portion for connecting a discharge port of the low-stage sidecompression device to a suction port of the high-stage sidecompression device.

In the heat pump cycle 10a, the outlet side of the heating expansion valve 13 is connected to the refrigerant inflow port of a gas-liquid separator 28, which serves as a gas-liquid separating portion that separates the refrigerant flowing out of the heating expansion valve 13 into vapor and liquid phase refrigerants.

This embodiment employs the gas-liquid separator 28 of a centrifugal type that separates the refrigerant into vapor and liquid phases by the effect of the centrifugal force that is generated by swirling the refrigerant flowing into the inner space of a cylindrical main body of the separator 28. The gas-liquid separator 28 has such an internal volume that cannot substantially retain excessive refrigerant even if the flow rate of refrigerant circulating through the cycle varies due to the fluctuations in load on the cycle.

A gas-phase refrigerant outflow port of the gas-liquid separator 28 is coupled to an intermediate-pressure suction port of the compressor 11a. In a refrigerant passage that connects the gas-phase refrigerant outflow port of the gas-liquid separator 28 to the intermediate-pressure suction port of the compressor 11*a*, a gas-phase refrigerant passage on-off valve 18*b* is provided for opening and closing the refrigerant passage. The gas-phase refrigerant passage on-off valve 18*b* has the substantially same structure as that of the heating on-off valve 18*a*.

Then, when the gas-phase refrigerant passage on-off valve 18*b* is open, the air conditioning controller 40 is switched to the refrigerant circuit that guides the gas-phase refrigerant flowing out of the gas-phase refrigerant outflow port of the gas-liquid separator 28 to the intermediate-pressure suction port of the compressor 11*a*. When the gas-phase refrigerant passage on-off valve 18*b* is closed, the air conditioning controller 40 is switched to the refrigerant circuit that prevents the refrigerant from flowing out of the gas-phase refrigerant outflow port of the gas-liquid separator 28. Therefore, the gas-phase refrigerant passage on-off valve 18*b* configures the refrigerant circuit switch.

On the other hand, the liquid-phase refrigerant outflow port of the gas-liquid separator 28 is connected to the inlet side of an intermediate-pressure fixed throttle 29 that serves as a decompression device for decompressing the liquid-phase refrigerant separated by the gas-liquid separator 28. Examples of the intermediate-pressure fixed throttle 29 suitable for use can include a nozzle, an orifice, a capillary tube, and the like, each having a fixed throttle opening degree. The outlet side of the intermediate-pressure fixed throttle 29 is connected to the refrigerant inlet side of the exterior heat exchanger 14.

The liquid-phase refrigerant outflow port of the gas-liquid separator 28 is connected to a fixed-throttle bypass passage 29*a* that guides the liquid-phase refrigerant separated by the gas-liquid separator 28 to the refrigerant inlet side of the exterior heat exchanger 14 while bypassing the intermediate-pressure fixed throttle 29. In the fixed-throttle bypass passage 29*a*, a bypass passage on-off valve 18*c* is disposed that opens and closes the fixed-throttle bypass passage 29*a*. The bypass passage on-off valve 18*c* has the substantially same basic structure as that of the gas-phase refrigerant passage on-off valve 18*b*.

A pressure loss caused when the refrigerant passes through the bypass passage on-off valve 18*c* is much smaller than that caused when the refrigerant passes through the intermediate-pressure fixed throttle 29. Thus, when the air conditioning controller 40 opens the bypass passage on-off valve 18*c*, the liquid-phase refrigerant flowing out of the gas-liquid separator 28 flows into the exterior heat exchanger 14 via the fixed-throttle bypass passage 29*a*. On the other hand, when the air conditioning controller 40 closes the bypass passage on-off valve 18*c*, the whole liquid-phase refrigerant flowing out of the gas-liquid separator 28 is decompressed by the intermediate-pressure fixed throttle 29, and then flows into the exterior heat exchanger 14.

Instead of the bypass passage on-off valve 18*c*, the intermediate-pressure fixed throttle 29, and the fixed-throttle bypass passage 29*a*, a variable throttle mechanism with the substantially same fully-opening function as the heating expansion valve 13 may be disposed in a refrigerant pipe leading from the liquid-phase refrigerant outflow port of the gas-liquid separator 28 to the refrigerant inlet side of the exterior heat exchanger 14. The structures of other components of the heat pump system 1 except for the above points are the same as those in the first embodiment.

Next, the operation of the heat pump system 1 with the above structure in this embodiment will be described below. Like the first embodiment, the heat pump system 1 of this embodiment can execute the operations in the air-cooling mode, the dehumidification heating mode, the air-heating mode, and the air-heating end mode. Now, the operation of the heat pump system in each of the operation modes will be described.

(a) Air-Cooling Mode

In an air-cooling mode of this embodiment, the air conditioning controller operates the high-temperature side coolant pump 21*a* and the low-temperature side coolant pump 22*a* so as to exhibit predetermined coolant pressure-feeding capacities thereof, thus completely closing the first and second coolant flow-rate adjustment valves 26*a* and 26*b*.

Thus, like the first embodiment, since in the heat-medium circulation circuit 20 of the air-cooling mode, the bypass flow rate becomes zero (0), the coolant circulating through the high-pressure side heat-medium circulation circuit 21 does not mix with the coolant circulating through the low-pressure side heat-medium circulation circuit 22, allowing the coolant to circulate through the respective heat-medium circulation circuits.

Further, the air conditioning controller 40 fully opens the heating expansion valve 13, brings the cooling expansion valve 16 into a throttle state, closes the heating on-off valve 18*a*, closes the gas-phase refrigerant passage on-off valve 18*b*, and opens the bypass passage on-off valve 18*c*.

In this way, in the heat pump cycle 10*a* of the air-cooling mode, as indicated by outlined arrows in FIG. 7, a vapor-compression refrigeration cycle is configured that allows the refrigerant to circulate through the compressor 11*a*, the high-temperature side coolant-refrigerant heat exchanger 12 (and the heating expansion valve 13, the gas-liquid separator 28, and the bypass passage on-off valve 18*c*), the exterior heat exchanger 14, the cooling expansion valve 16, the interior evaporator 17, the accumulator 19, and the compressor 11*a* in this order.

That is, in the air-cooling mode of this embodiment, the refrigeration cycle is configured to allow the refrigerant to circulate through the components thereof in the substantially same order as in the air-cooling mode of the first embodiment. The other operations except for those described above are the same as those in the air cooling mode of the first embodiment. Thus, in the air-cooling mode of this embodiment, the vehicle interior as well as the inverter Inv can be cooled in the same way as that in the air-cooling mode of the first embodiment.

(b) Dehumidification Heating Mode

In a dehumidification heating mode of this embodiment, the air conditioning controller 40 operates the high-temperature side coolant pump 21*a* and the low-temperature side coolant pump 22*a* so as to exhibit predetermined coolant pressure-feeding capacities thereof, thus completely closing the first and second coolant flow-rate adjustment valves 26*a* and 26*b*.

Thus, since in the heat-medium circulation circuit 20 of the dehumidification heating mode, the bypass flow rate becomes zero (0), the coolant circulating through the high-pressure side heat-medium circulation circuit 21 does not mix with the coolant circulating through the low-pressure side heat-medium circulation circuit 22, allowing the coolant to circulate through the respective heat-medium circulation circuits.

Further, the air conditioning controller 40 brings the heating expansion valve 13 into a throttle state, fully opens the cooling expansion valve 16, closes the heating on-off valve 18*a*, closes the gas-phase refrigerant passage on-off valve 18*b*, and opens the bypass passage on-off valve 18*c*.

In this way, in the heat pump cycle 10*a* of the dehumidification heating mode, as indicated by diagonal hatched arrows in FIG. 7, a vapor-compression refrigeration cycle is configured that allows the refrigerant to circulate through the compressor 11a, the high-temperature side coolant-refrigerant heat exchanger 12, the heating expansion valve 13 (the gas-liquid separator 28, and the bypass passage on-off valve 18c), the exterior heat exchanger 14 (the cooling expansion valve 16), the interior evaporator 17, the accumulator 19, and the compressor 11a in this order.

That is, in the dehumidification heating mode of this embodiment, the refrigeration cycle is configured to allow the refrigerant to circulate through the components thereof in the substantially same order as in the dehumidification heating mode of the first embodiment. Other operations except for those described above are the same as those in the dehumidification heating mode of the first embodiment. Thus, in the dehumidification heating mode of this embodiment, like the dehumidification heating mode of the first embodiment, the dehumidification and air-heating of the vehicle interior can be carried out, while the waste heat from the inverter Inv can be effectively used to reheat the ventilation air.

(c) Air-Heating Mode

In an air-heating mode of this embodiment, the air conditioning controller operates the high-temperature side coolant pump 21a and the low-temperature side coolant pump 22a so as to exhibit predetermined coolant pressure-feeding capacities thereof, thus opening the first and second coolant flow-rate adjustment valves 26a and 26b. Thus, like the first embodiment, the heat-medium circulation circuit 20 in the air-heating mode not only allows the coolant to circulate through the respective heat-medium circulation circuits 21 and 22, but also allows a part of the coolant circulating through the high-pressure side heat-medium circulation circuit 21 to flow into the low-pressure side heat-medium circulation circuit 22 while allowing a part of the coolant circulating through the low-pressure side heat-medium circulation circuit 22 to return to the high-pressure side heat-medium circulation circuit 21.

Further, the air conditioning controller 40 brings the heating expansion valve 13 into a throttle state, completely closes the cooling expansion valve 16, opens the heating on-off valve 18a, opens the gas-phase refrigerant passage on-off valve 18b, and closes the bypass passage on-off valve 18c.

Thus, in the heat pump cycle 10a of the air heating mode, as indicated by black arrows of FIG. 7, a gas injection cycle is configured that allows the refrigerant to circulate through the compressor 11a, the high-temperature side coolant-refrigerant heat exchanger 12, the heating expansion valve 13, the gas-liquid separator 28, the intermediate-pressure fixed throttle 29, the exterior heat exchanger 14 (and the accumulator-side passage 18), the accumulator 19, and the compressor 11a in this order, while allowing the gas-phase refrigerant to flow out of the gas-phase refrigerant outflow port of the gas-liquid separator 28 into the intermediate-pressure suction port of the compressor 11a. The operations except for those described above are the same as those in the air-heating mode of the first embodiment.

Thus, in the heat pump cycle 10a during the air-heating mode, like the air-heating mode of the first embodiment, the high-pressure refrigerant discharged from the compressor 11a flows into the high-temperature side coolant-refrigerant heat exchanger 12, thereby heating the coolant circulating through the high-pressure side heat-medium circulation circuit 21. Further, the coolant heated by the high-temperature side coolant-refrigerant heat exchanger 12 is allowed to flow into the heater core 23, thereby heating the ventilation air.

The refrigerant flowing out of the high-temperature side coolant-refrigerant heat exchanger 12 flows into the heating expansion valve 13 to be decompressed into an intermediate-pressure refrigerant. The intermediate-pressure refrigerant decompressed by the heating expansion valve 13 flows into the gas-liquid separator 28 to be separated into the gas and liquid phase refrigerants. The gas-phase refrigerant separated by the gas-liquid separator 28 is drawn into the intermediate-pressure suction port of the compressor 11a because the gas-phase refrigerant passage on-off valve 18b is open, and then merges with the intermediate-pressure refrigerant discharged from the low-stage side compression mechanism to thereby be drawn into the high-stage side compression mechanism.

On the other hand, the liquid-phase refrigerant separated by the gas-liquid separator 28 flows out of the liquid-phase refrigerant outflow port of the gas-liquid separator 28 into the intermediate-pressure fixed throttle 29 side because the bypass passage on-off valve 18c is closed. Then, the refrigerant is decompressed by the intermediate-pressure fixed throttle 29 into a low-pressure refrigerant. The refrigerant exiting the intermediate-pressure fixed throttle 29 flows into the exterior heat exchanger 14, and then absorbs heat from the outside air blown from the blower fan 14a and having passed through the radiator 24, to evaporate itself.

At this time, in the radiator 24, the refrigerant circulating through the low-pressure side heat-medium circulation circuit 22 exchanges heat with the outside air blown from the blower fan 14a, thereby dissipating heat from the refrigerant itself. The operation of the heat pump cycle 10a following this step will be the same as that in the first embodiment.

Thus, in the air-heating mode of this embodiment, like the air-heating mode of the first embodiment, the ventilation air heated by the heater core 23 is blown toward the vehicle interior, thereby enabling the air-heating of the vehicle interior, while the waste heat from the inverter Inv can be effectively used as a heat source for heating the ventilation air.

Further, like the air-heating mode of the first embodiment, the refrigerant evaporation temperature at the exterior heat exchanger 14 can be increased, thereby suppressing the frost formation at the exterior heat exchanger 14, regardless of the operating state of the inverter Inv as the external heat source.

In the air heating mode, the heat pump cycle 10a of this embodiment is switched to the refrigerant circuit configuring the gas injection cycle that pressurizes the refrigerant in multiple stages and merges the intermediate-pressure refrigerant generated in the cycle with the refrigerant discharged from the low-stage side compression mechanism to draw the merged refrigerant into the high-stage side compression mechanism. Thus, the mechanical efficiency (compression efficiency) of the compressor 11a can be enhanced to improve the COP.

(d) Air-Heating End Mode

In an air-heating end mode of this embodiment, the air conditioning controller 40 stops the operations of the compressor 11a and the blower 32. Further, the air conditioning controller 40 operates the high-temperature side coolant pump 21a and the low-temperature side coolant pump 22a so as to exhibit predetermined coolant pressure-feeding capacities thereof, thus fully opening the first and second coolant flow-rate adjustment valves 26a and 26b. The operations except for those described above are the same as those in the air-heating end mode of the first embodiment.

Thus, in the air-heating end mode of this embodiment, like the air-heating end mode of the first embodiment, the heat included in the coolant circulating through the radiator 24 can be used to defrost the exterior heat exchanger 14, regardless of the operating state of the inverter Inv as the external heat source, even if frost formation occurs at the exterior heat exchanger 14 immediately before the end of the air-heating mode.

Figure 8:
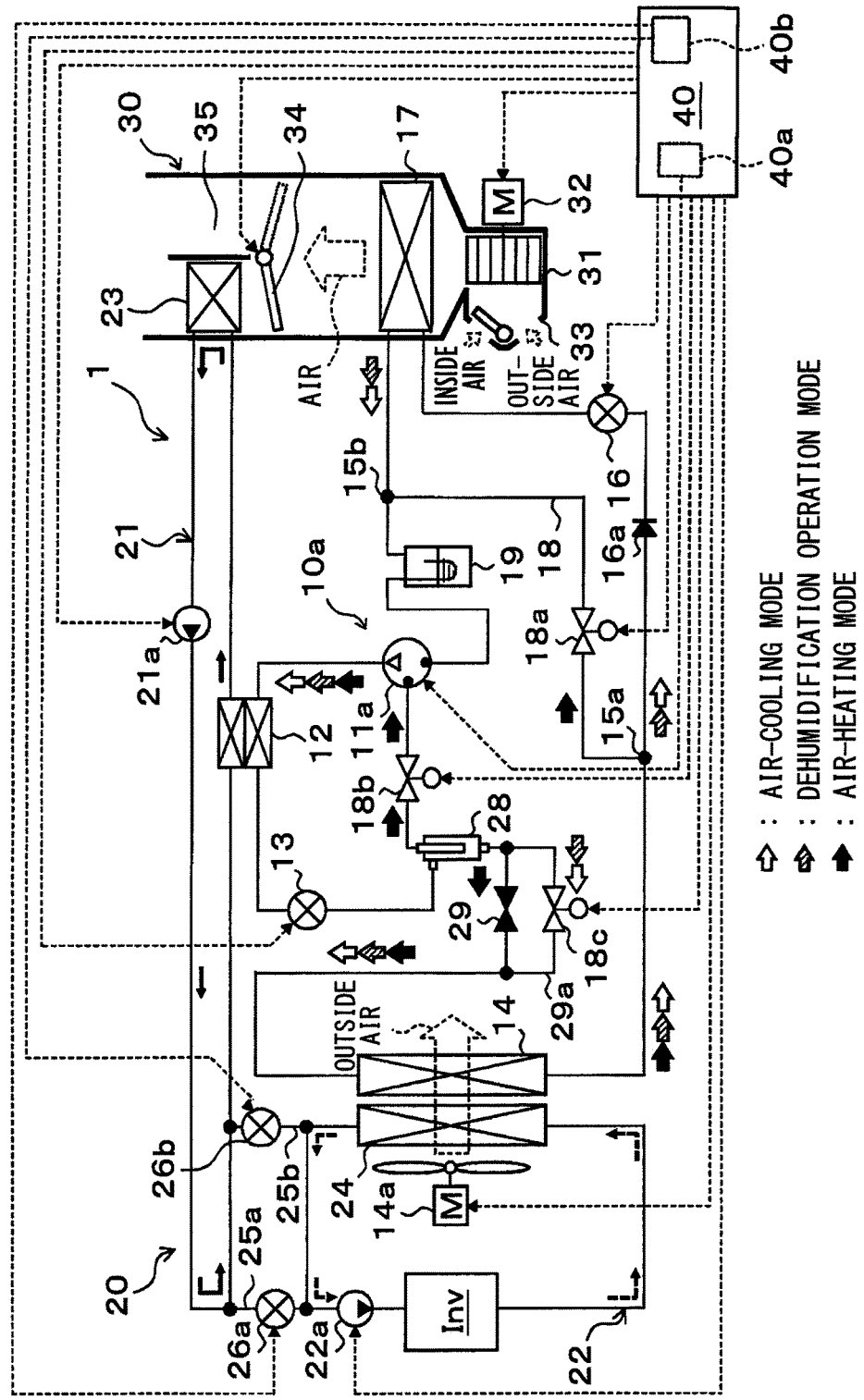
FIG. 8 is a schematic entire configuration diagram of a heat pump system according to a fifth embodiment.

As shown in the entire configuration diagram of FIG. 8, a fifth embodiment employs the heat pump cycle 10a described in the fourth embodiment, compared to the structure of the second embodiment. The structures and operations of other components of the heat pump system 1 except for the above points are the same as those in the second embodiment. Thus, even the operation of the heat pump system 1 of this embodiment can perform the air-cooling, dehumidification heating, and air-heating of the vehicle interior, thereby obtaining the substantially same effects as those in the second embodiment. Further, in the air-heating mode, the gas injection cycle can be configured to improve the COP.

Figure 9:
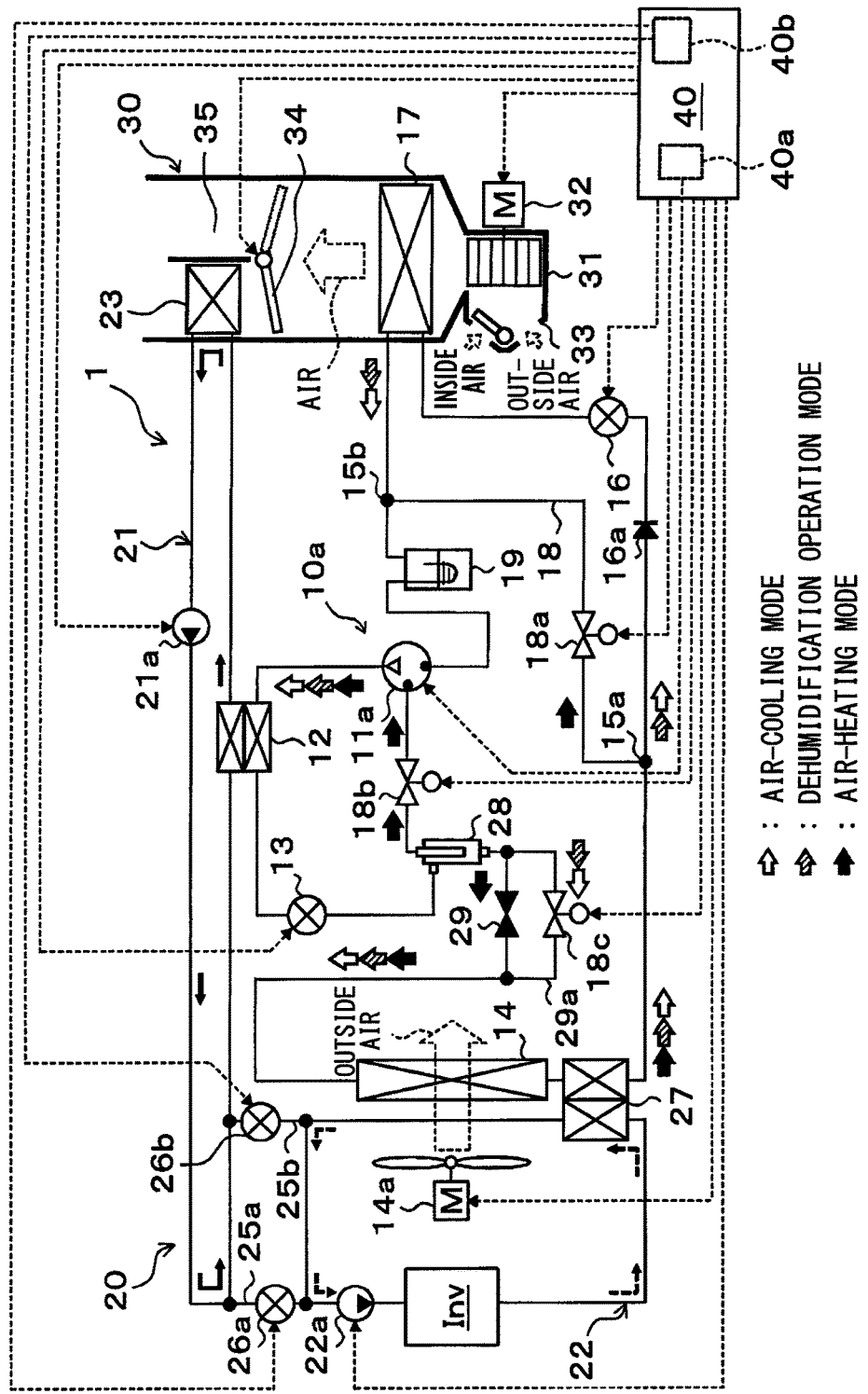
FIG. 9 is a schematic entire configuration diagram of a heat pump system according to a sixth embodiment.

As shown in the entire configuration diagram of FIG. 9, a sixth embodiment employs the heat pump cycle 10a described in the fourth embodiment, compared to the structure of the third embodiment. The structures and operations of other components of the heat pump system 1 except for the above points are the same as those in the third embodiment. Thus, even the operation of the heat pump system 1 of this embodiment can perform the air-cooling, dehumidification heating, and air-heating of the vehicle interior, thereby obtaining the substantially same effects as those of the third embodiment. Further, in the air-heating mode, the gas injection cycle can be configured to obtain the effect of improving the COP.

Seventh to Ninth Embodiments

Figure 10:
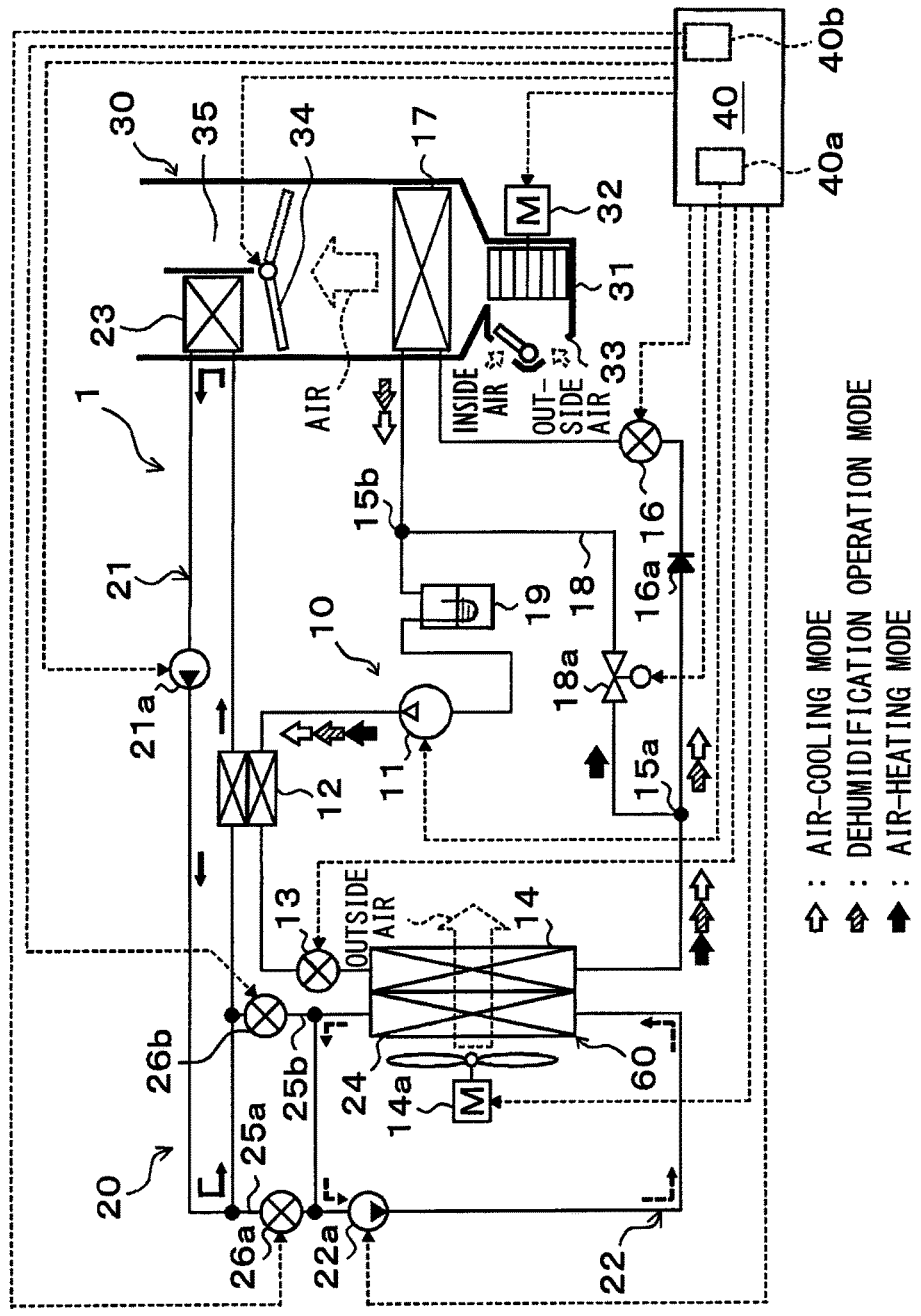
FIG. 10 is a schematic entire configuration diagram of a heat pump system according to a seventh embodiment.

In a seventh embodiment, compared to the first embodiment, as shown in the entire configuration diagram of FIG. 10, the inverter Inv as the external heat source is not connected to the low-pressure side heat-medium circulation circuit 22. The structures and operations of other components in the seventh embodiment are the same as those in the first embodiment.

Here, as described in the first embodiment, the heat pump system 1 can achieve the defrosting or suppression of frost formation in the exterior heat exchanger 14 without depending on the heat supplied from the external heat source and the like. Thus, even though the inverter Inv is withdrawn, like the heat pump system 1 of this embodiment, the same effects as those of the first embodiment can be obtained.

Figure 11:
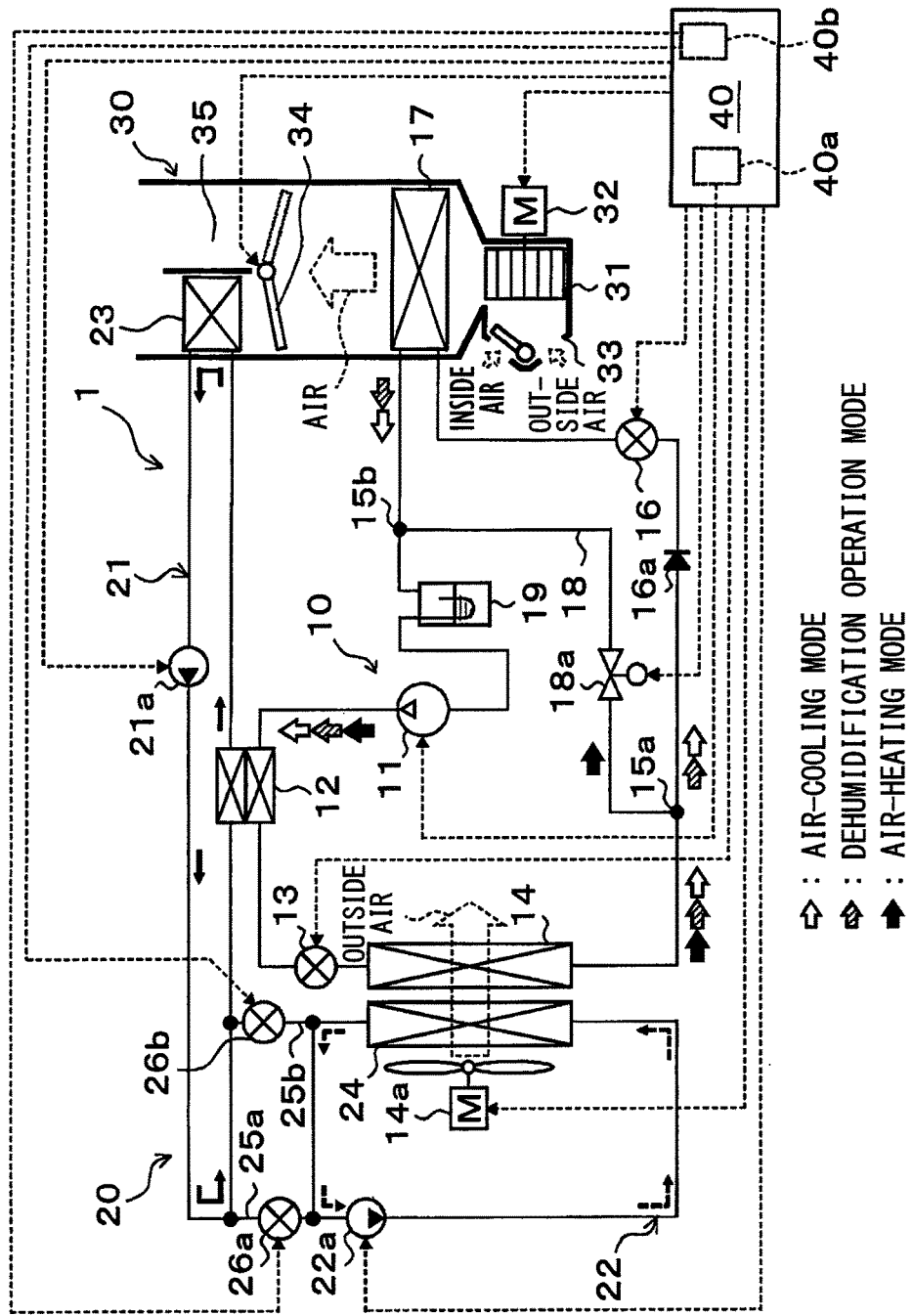
FIG. 11 is a schematic entire configuration diagram of a heat pump system according to an eighth embodiment.

In an eighth embodiment, compared to the second embodiment, as shown in the entire configuration diagram of FIG. 11, the inverter Inv as the external heat source is not connected to the low-pressure side heat-medium circulation circuit 22. The structures and operations of other components in the eighth embodiment are the same as those in the second embodiment. Thus, the heat pump system 1 of this embodiment can obtain the substantially same effects as those in the second embodiment.

Figure 12:
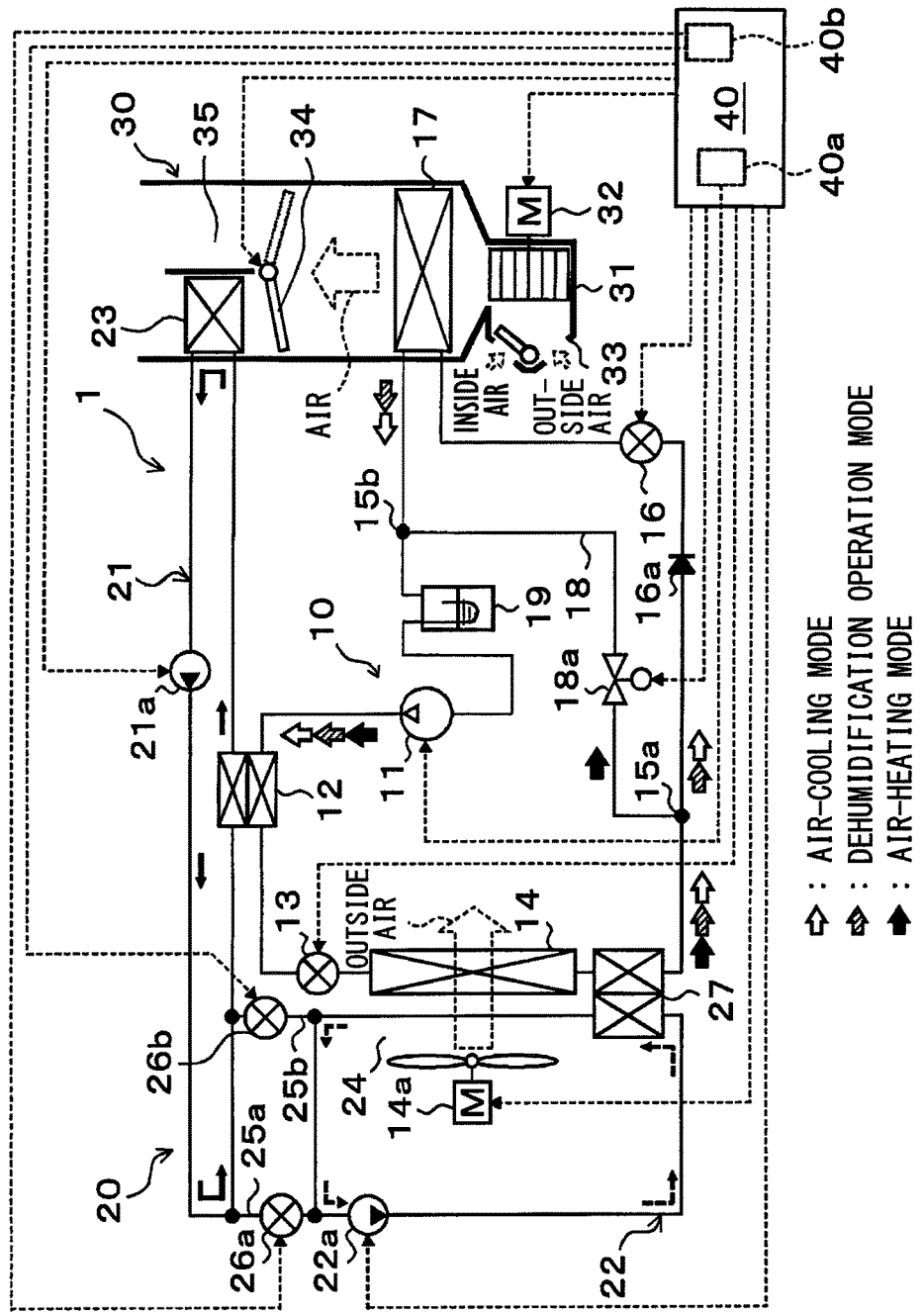
FIG. 12 is a schematic entire configuration diagram of a heat pump system according to a ninth embodiment.

In a ninth embodiment, compared to the third embodiment, as shown in the entire configuration diagram of FIG. 12, the inverter Inv as the external heat source is not connected to the low-pressure side heat-medium circulation circuit 22. The structures and operations of other components in the ninth embodiment are the same as those in the third embodiment. Thus, the heat pump system 1 of this embodiment can obtain the substantially same effects as those in the third embodiment.

Tenth to Twelfth Embodiments

Figure 13:
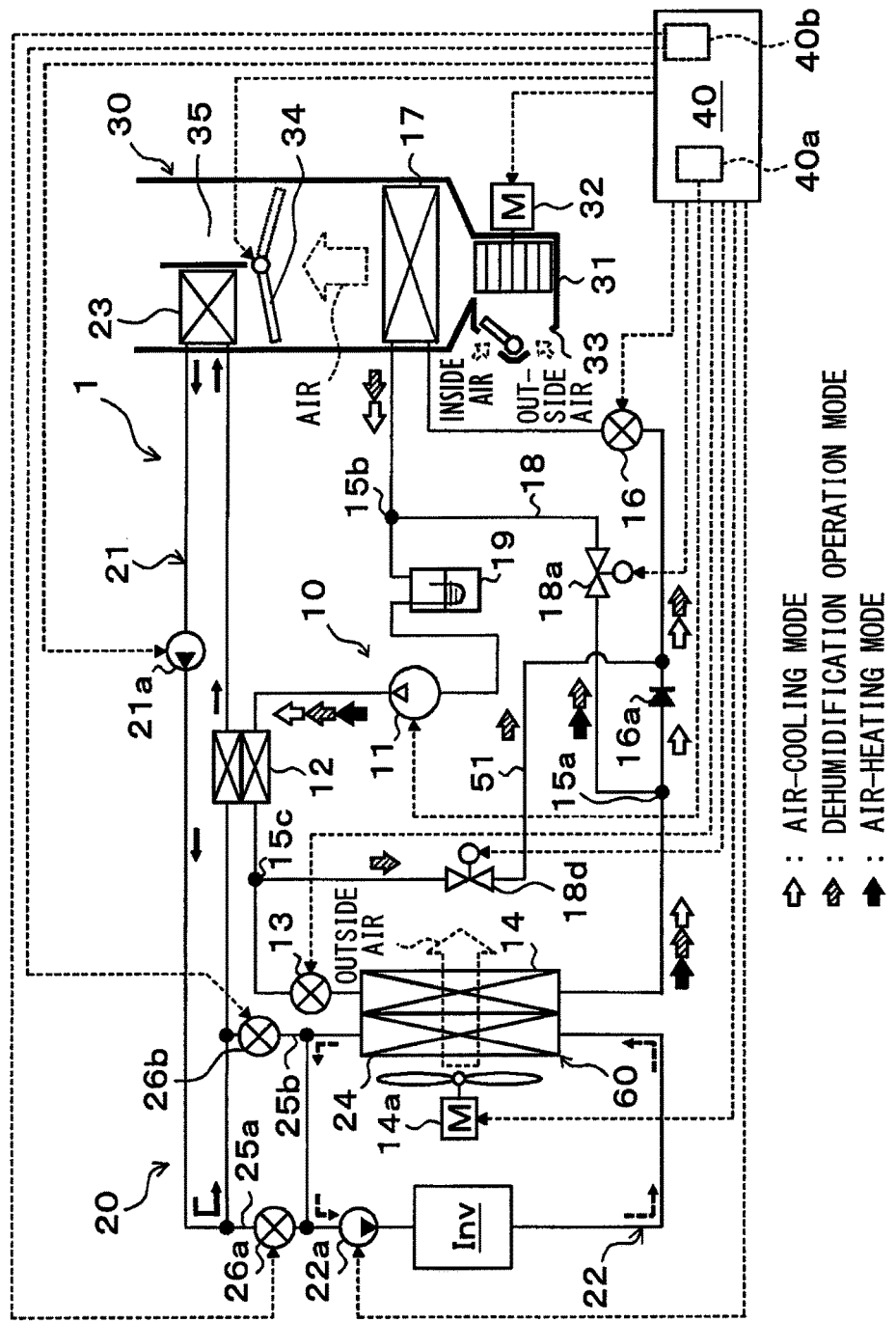
FIG. 13 is a schematic entire configuration diagram of a heat pump system according to a tenth embodiment.

As shown in the entire configuration diagram of FIG. 13, a tenth embodiment changes the configuration of the heat pump cycle 10 in the first embodiment.

Specifically, the heat pump cycle 10 of this embodiment is provided with a high-pressure side branch portion 15c that branches the flow of refrigerant flowing out of the refrigerant passage in the high-temperature side coolant-refrigerant heat exchanger 12. The high-pressure side branch portion 15c has the substantially same basic structure as that of the low-pressure side branch portion 15a. One of the refrigerant outflow ports of the high-pressure side branch portion 15c is connected to the inlet side of the heating expansion valve 13, while the other refrigerant outflow port of the high-pressure side branch portion 15c is connected to the inlet side of an exterior-device bypass passage 51.

The exterior-device bypass passage 51 is a refrigerant passage that guides the refrigerant branched by the high-pressure side branch portion 15c toward the upstream side of the refrigerant flow in the cooling expansion valve 16 while bypassing the heating expansion valve 13 as well as the exterior heat exchanger 14. The exterior-device bypass passage 51 is provided with an exterior-device bypass passage on-off valve 18d that opens and closes the exterior-device bypass passage 51. The bypass passage on-off valve 18c has the substantially same basic structure as that of the heating on-off valve 18a or the like, the basic structure configuring the refrigerant circuit switch in this embodiment. The structures of other components of the heat pump system 1 except for the above points are the same as those in the first embodiment.

Next, the operation of the heat pump system 1 with the above arrangement in this embodiment will be described below. Like the first embodiment, the heat pump system 1 of this embodiment can also execute the operations in the air-cooling mode, the dehumidification heating mode, the air-heating mode, and the air-heating end mode. Now, the operation of the heat pump system in each of the operation modes will be described.

(a) Air-Cooling Mode

In an air-cooling mode of this embodiment, the air conditioning controller 40 operates the high-temperature side coolant pump 21a and the low-temperature side coolant pump 22a so as to exhibit predetermined coolant pressure-feeding capacities thereof, thus completely closing the first and second coolant flow-rate adjustment valves 26a and 26b. Further, the air conditioning controller 40 fully opens the heating expansion valve 13, brings the cooling expansion valve 16 into a throttle state, closes the heating on-off valve 18a, and closes the exterior-device bypass passage on-off valve 18d.

In this way, a vapor-compression refrigeration cycle is configured such that in the heat-medium circulation circuit 20 of the air-cooling mode, the coolant circulates in the same manner as in the dehumidification heating mode of the first embodiment, while in the heat pump cycle 10 of the air-cooling mode, the refrigerant circulates as indicated by outlined arrows of FIG. 13, just like in the first embodiment. The operations except for those described above are the same as those in the air-cooling mode of the first embodiment.

Thus, in the air-cooling mode of this embodiment, the vehicle interior can be cooled while cooling the inverter InV, like in the air-cooling mode of the first embodiment.

(b) Dehumidification Heating Mode

In a dehumidification heating mode of this embodiment, the air conditioning controller 40 operates the high-temperature side coolant pump 21a and the low-temperature side coolant pump 22a so as to exhibit predetermined coolant pressure-feeding capacities thereof, thus completely closing the first and second coolant flow-rate adjustment valves 26a and 26b.

Thus, since in the heat-medium circulation circuit 20 of the dehumidification heating mode, the bypass flow rate becomes zero (0), the coolant circulating through the high-pressure side heat-medium circulation circuit 21 does not mix with the coolant circulating through the low-pressure side heat-medium circulation circuit 22, allowing the coolants to circulate through the respective heat-medium circulation circuits.

Further, the air conditioning controller 40 brings the heating expansion valve 13 into a throttle state, brings the cooling expansion valve 16 into a throttle state, closes the heating on-off valve 18a, and opens the exterior-device bypass passage on-off valve 18d.

In this way, in the heat pump cycle 10 of the dehumidification heating mode, as indicated by diagonal hatched arrows in FIG. 13, a vapor-compression refrigeration cycle is configured that allows the refrigerant to circulate through the compressor 11, the high-temperature side coolant-refrigerant heat exchanger 12, the heating expansion valve 13, the exterior heat exchanger 14 (the accumulator-side passage 18), the accumulator 19, and the compressor 11 in this order. Simultaneously, the vapor-compression refrigerant cycle is configured that allows the refrigerant to circulate through the high-temperature side coolant-refrigerant heat exchanger 12 (the exterior-device bypass passage 51), the cooling expansion valve 16, the interior evaporator 17, and the accumulator 19 in this way.

That is, in the heat pump cycle 10 of the dehumidification heating mode, the exterior heat exchanger 14 and the interior evaporator 17 are connected in parallel to the refrigerant flow. With such a configuration of the heat-medium circulation circuit and the refrigerant circuit, the air conditioning controller 40 determines the control signals to be output to the heating expansion valve 13 and the cooling expansion valve 16 such that the throttle opening degree of each of the heating expansion valve 13 and the cooling expansion valve 16 becomes a predetermined opening degree for dehumidification heating. The operations except for those described above are the same as those in the dehumidification heating mode of the first embodiment.

Thus, in the heat pump cycle 10 during the dehumidification heating mode, like the dehumidification heating mode of the first embodiment, the high-pressure refrigerant discharged from the compressor 11 flows into the high-temperature side coolant-refrigerant heat exchanger 12, thereby heating the coolant circulating through the high-pressure side heat-medium circulation circuit 21. Further, the coolant heated by the high-temperature side coolant-refrigerant heat exchanger 12 is allowed to flow into the heater core 23, thereby heating the ventilation air.

The flow of refrigerant flowing out of the high-temperature side coolant-refrigerant heat exchanger 12 is branched by the high-pressure side branch portion 15c. One of the refrigerants branched by the high-pressure side branch portion 15c is decompressed into the low-pressure refrigerant at the heating expansion valve 13 to flow into the exterior heat exchanger 14. The refrigerant flowing into the exterior heat exchanger 14 absorbs heat from the outside air blown from the blower fan 14a and having passed through the radiator 24, to evaporate at the exterior heat exchanger 14.

At this time, in the radiator 24, the refrigerant circulating through the low-pressure side heat-medium circulation circuit 22 exchanges heat with the outside air blown from the blower fan 14a, thereby dissipating heat from the refrigerant into the outside air.

As the heating on-off valve 18a is open, the refrigerant flowing out of the exterior heat exchanger 14 flows into the accumulator 19 via the low-pressure side branch portion 15a, the accumulator-side passage 18, and the merging portion 15b to be separated into gas and liquid phase refrigerants. At this time, the refrigerant exiting the exterior heat exchanger 14 is prevented from flowing out toward the cooling expansion valve 16 because of the operation of the check valve 16a. The gas-phase refrigerant separated by the accumulator 19 is drawn into the compressor 11 and compressed therein again.

The other of the refrigerants branched by the high-pressure side branch portion 15c is decompressed into the low-pressure refrigerant at the cooling expansion valve 16 to flow into the interior evaporator 17. The refrigerant flowing into the interior evaporator 17 absorbs heat from the ventilation air blown from the blower 32 to evaporate itself at the interior evaporator 17. Thus, the ventilation air is cooled. The refrigerant flowing out of the interior evaporator 17 flows into the accumulator 19 via the merging portion 15b.

As mentioned above, in the heat pump system 1 of the dehumidification cooling mode, the ventilation air cooled and dehumidified by the interior evaporator 17 is reheated by the heater core 23 to be blown into the vehicle interior, thereby enabling the dehumidification and air-heating of the vehicle interior. The heat absorbed from the inverter Inv by the refrigerant circulating through the low-pressure side heat-medium circulation circuit 22 is dissipated into the outside air and the like at the radiator 24, thereby enabling cooling of the inverter Inv.

In the dehumidification heating mode of this embodiment, the exterior heat exchanger 14 and the interior evaporator 17 are coupled together in parallel to the refrigerant flow, so that the refrigerant evaporation temperature at the exterior heat exchanger 14 can be reduced to a level lower than that at the interior evaporator 17.

That is, to suppress the front formation at the interior evaporator 17, the refrigerant evaporation temperature at the exterior heat exchanger 14 is set lower than a reference frost-formation preventing temperature if the refrigerant evaporation temperature at the interior evaporator 17 is higher than the above-mentioned reference frost-formation preventing temperature, which can increase the amount of heat absorbed by the refrigerant in the exterior heat exchanger 14.

As a result, this embodiment can increase the heating capacity for ventilation air, compared to a case, like the first embodiment, where the exterior heat exchanger 14 and the interior evaporator 17 are coupled together in series in this order with respect to the refrigerant flow, making it impossible for the refrigerant evaporation temperature at the exterior heat exchanger 14 to be lower than that at the interior evaporator 17.

(c) Air-Heating Mode

In an air-heating mode of this embodiment, the air conditioning controller 40 operates the high-temperature side coolant pump 21a and the low-temperature side coolant pump 22a so as to exhibit predetermined coolant pressure-feeding capacities thereof, thus opening the first and second coolant flow-rate adjustment valves 26a and 26b. Further, the air conditioning controller 40 brings the heating expansion valve 13 into a throttle state, completely closes the cooling expansion valve 16, opens the heating on-off valve 18a, and closes the exterior-device bypass passage on-off valve 18d.

In this way, a vapor-compression refrigeration cycle is configured such that in the heat-medium circulation circuit 20 of the air-heating mode, the coolant circulates in the same manner as in the heating mode of the first embodiment, while in the heat pump cycle 10 of the air-cooling mode, the refrigerant circulates as indicated by black arrows of FIG. 13, just like in the first embodiment. The operations except for those described above are the same as those in the air-heating mode of the first embodiment.

Thus, in the air-heating mode of this embodiment, like the air-heating mode of the first embodiment, the air-heating of the vehicle interior can be carried out, while the waste heat from the inverter Inv can be effectively used as a heat source to heat the ventilation air. Further, like the air-heating mode of the first embodiment, the refrigerant evaporation temperature at the exterior heat exchanger 14 can be increased, thereby suppressing the frost formation at the exterior heat exchanger 14, regardless of the operating state of the inverter Inv as the external heat source.

(d) Air-Heating End Mode

In an air-heating end mode of this embodiment, the air conditioning controller 40 stops the operations of the compressor 11 and the blower 32. Further, the air conditioning controller 40 operates the high-temperature side coolant pump 21a and the low-temperature side coolant pump 22a so as to exhibit predetermined coolant pressure-feeding capacities thereof, thus fully opening the first and second coolant flow-rate adjustment valves 26a and 26b. The operations except for those described above are the same as those in the air-heating end mode of the first embodiment.

Thus, in the air-heating end mode of this embodiment, like the air-heating end mode of the first embodiment, the heat included in the coolant circulating through the radiator 24 can be used to defrost the exterior heat exchanger 14, regardless of the operating state of the inverter Inv as the external heat source, even if frost formation occurs at the exterior heat exchanger 14 immediately before the end of the air-heating mode.

Figure 14:
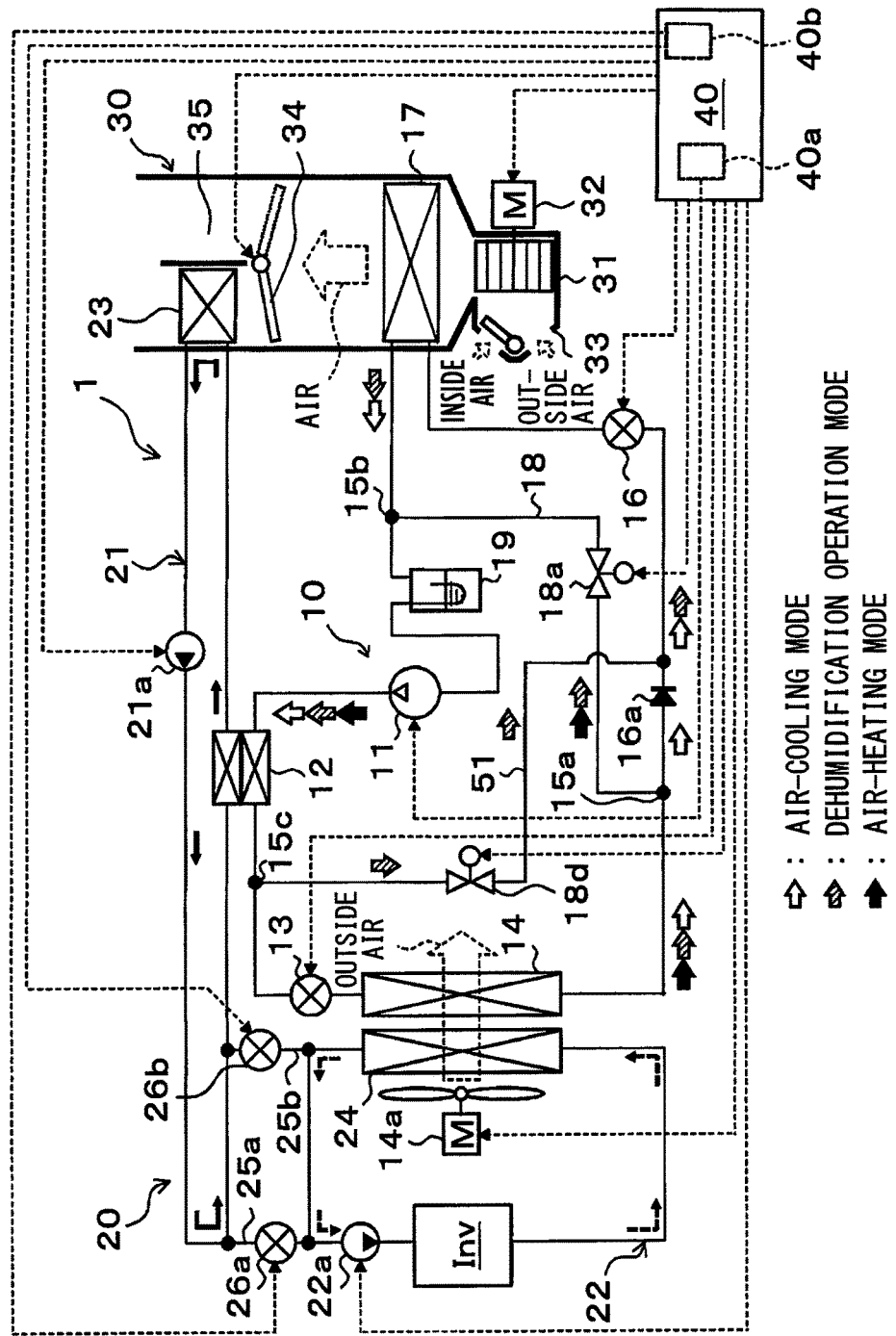
FIG. 14 is a schematic entire configuration diagram of a heat pump system according to an eleventh embodiment.

In an eleventh embodiment, as shown in the entire configuration diagram of FIG. 14, the high-pressure side branch portion 15c, the exterior-device bypass passage 51, and a bypass passage on-off valve 18c are added to the configuration of the second embodiment. The structures of other components of the heat pump system 1 except for the above points are the same as those in the second embodiment.

Thus, in an operation mode other than the dehumidification heating mode, the exterior-device bypass passage on-off valve 18d is closed, so that the heat pump cycle can be operated in the same way as in the second embodiment, and can obtain the substantially same effects as those in the second embodiment. Further, in the dehumidification heating mode, the exterior-device bypass passage on-off valve 18d is open, so that the heating capacity for the ventilation air can be improved like the tenth embodiment.

Figure 15:
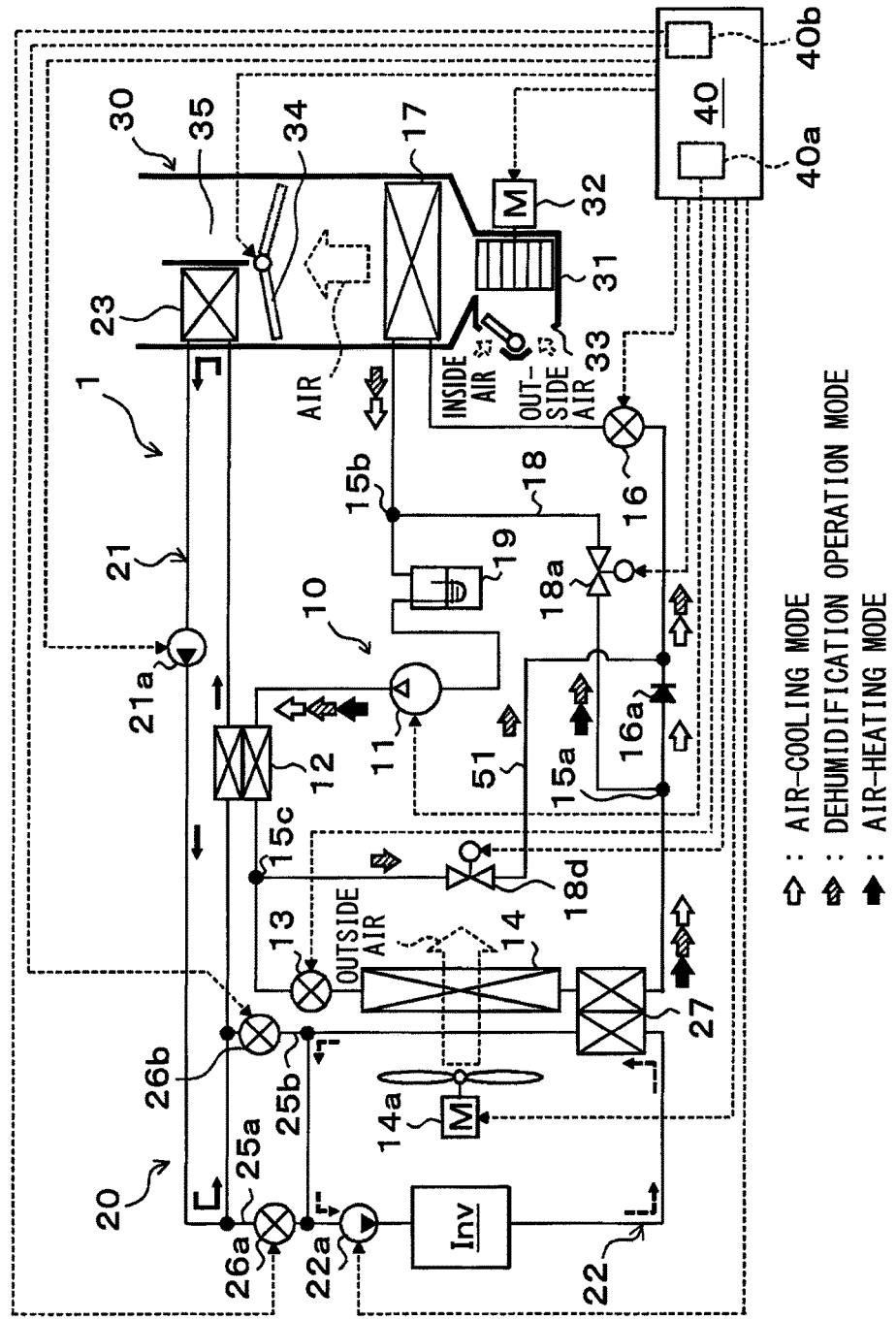
FIG. 15 is a schematic entire configuration diagram of a heat pump system according to a twelfth embodiment.

In a twelfth embodiment, as shown in the entire configuration diagram of FIG. 15, the high-pressure side branch portion 15c, the exterior-device bypass passage 51, and a bypass passage on-off valve 18c are added to the configuration of the third embodiment. The structures of other components of the heat pump system 1 except for the above points are the substantially same as those in the third embodiment.

Therefore, in an operation mode other than the dehumidification heating mode, the exterior-device bypass passage on-off valve 18d is closed, so that the heat pump cycle can be operated in the same way as in the third embodiment, and thus can exhibit the substantially same effects as those in the third embodiment. Further, in the dehumidification heating mode, the exterior-device bypass passage on-off valve 18d is opened, so that the heating capacity for the ventilation air can be improved like the tenth embodiment.

Other Embodiments

The present disclosure is not limited to the above-mentioned embodiments, and various modifications and changes can be made to those embodiments in the following way without departing from the scope of the present disclosure.

(1) Although in the above-mentioned embodiments, the heat pump system 1 according to the present disclosure is applied to air conditioners for hybrid vehicles by way of example, the application of the heat pump system 1 is not limited thereto.

Alternatively, for example, the heat pump cycle of the present disclosure may be applied to air conditioners for electric vehicles (including fuel cell vehicles) that obtain a driving force for traveling from electric motors for traveling, as well as air conditioners for normal vehicles that obtain a driving force for traveling from engines. Further, the heat pump system 1 according to the present disclosure is not limited to one dedicated for vehicles, and may be applied to a stationary air conditioner, a cooling storage, a liquid heating-cooling equipment, and the like.

Furthermore, in the above-mentioned embodiments, the vehicle-mounted device (external heat source) accompanied by generation of heat during operation employs the inverter Inv by way of example. However, the external heat source is not limited thereto. For example, when the heat pump system 1 is applied to the vehicle air conditioner, electric devices, including the engine and the traveling electric motor, can be employed as the external heat source.

(2) Although the above-mentioned embodiments employ the first and second coolant flow-rate adjustment valves 26a and 26b as the heat-medium flow-rate adjustment device by way of example, the heat-medium flow-rate adjustment device is not limited thereto. Note that for example, one of the first and second coolant flow-rate adjustment valves 26a and 26b may be configured as an on-off valve for opening and closing a coupling flow path. The flow-rate adjustment valve may be controlled to be open when the other flow-rate adjustment valve opens the coupling flow path.

Alternatively or additionally, a first three-way flow-rate adjustment valve is disposed at a connection portion between the high-pressure side heat-medium circulation circuit 21 and the first coupling flow path 25a. The first three-way flow-rate adjustment valve is adapted to adjust the ratio of the flow rate of the heat medium circulating through the high-pressure side heat-medium circulation circuit 21 to the bypass flow rate of the heat medium flowing out of the high-pressure side heat-medium circulation circuit 21 into the low-pressure side heat-medium circulation circuit 22. Further, a second three-way flow-rate adjustment valve is disposed at a connection portion between the low-pressure side heat-medium circulation circuit 22 and the second coupling flow path 25b. The second three-way flow-rate adjustment valve is adapted to adjust the ratio of the flow rate of the heat medium circulating through the low-pressure side heat-medium circulation circuit 22 to the bypass flow rate of the heat medium returning from the low-pressure side heat-medium circulation circuit 22 to the high-pressure side heat-medium circulation circuit 21. Then, the heat-medium flow-rate adjustment device may be configured of the first and second three-way flow-rate adjustment valves.

Figure 16:
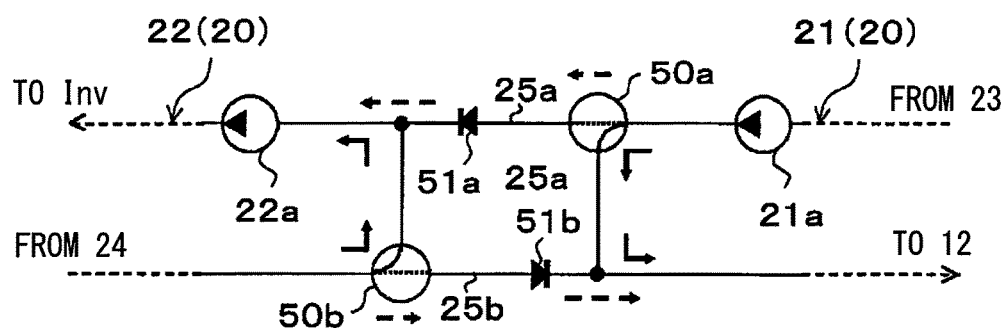
FIG. 16 is a schematic configuration diagram of a heat-medium circulation circuit, showing a heat-medium flow-rate adjustment device according to another embodiment.

Alternatively or additionally, to achieve the heat-medium flow-rate adjustment device with a simple structure, as shown in a schematic configuration diagram of the heat-medium circulation circuit 20 in FIG. 16, the first and second three-way valves 50a and 50b may configure the heat-medium flow-rate adjustment device.

Specifically, as shown in FIG. 16, the first three-way valve 50a is disposed at the connection part between the high-pressure side heat-medium circulation circuit 21 and the first coupling flow path 25a. The first three-way valve 50a has a function of switching between a circuit for connecting the discharge port side of the high-temperature side coolant pump 21a and the coolant inlet side of the high-temperature side coolant-refrigerant heat exchanger 12, and a circuit for connecting the discharge port side of the high-temperature side coolant pump 21a and the suction port side of the low-temperature side coolant pump 22a.

The second three-way valve 50b is disposed at the connection part between the low-pressure side heat-medium circulation circuit 22 and the second coupling flow path 25b. The second three-way valve 50b has a function of switching between a circuit for connecting the coolant outlet side of the radiator 24 and the suction port side of the low-temperature side coolant pump 22a, and a circuit for connecting the coolant outlet side of the radiator 24 and the coolant inlet side of the high-temperature side coolant-refrigerant heat exchanger 12.

In the first coupling flow path 25a, a first check valve 51a is provided that allows for only the coolant to flow from the high-pressure side heat-medium circulation circuit 21 side to the low-pressure side heat-medium circulation circuit 22 side. In the second coupling flow path 25b, a second check valve 51b is provided that allows for only the coolant to flow from the low-pressure side heat-medium circulation circuit 22 side to the high-pressure side heat-medium circulation circuit 21 side.

As indicated by thick solid arrows in FIG. 16, switching is performed to a circuit that causes the first three-way valve 50a to connect the discharge port side of the high-temperature side coolant pump 21a and the coolant inlet side of the high-temperature side coolant-refrigerant heat exchanger 12, while causing the second three-way valve 50b to connect the coolant outlet side of the radiator 24 and the suction port side of the low-temperature side coolant pump 22a. Thus, the heat-medium circulation circuit can be configured to prevent the mixing of the coolant circulating through the high-pressure side heat-medium circulation circuit 21 and that through the low-pressure side heat-medium circulation circuit 22.

On the other hand, as indicated by thick dashed arrows in FIG. 16, switching is performed to a circuit that causes the first three-way valve 50a to connect the discharge port side of the high-temperature side coolant pump 21a and the suction port side of the low-temperature side coolant pump 22a, while causing the second three-way valve 50b to connect the coolant outlet side of the radiator 24 to the coolant inlet side of the high-temperature side coolant-refrigerant heat exchanger 12. Thus, the heat-medium circulation circuit can be configured that allows the whole coolant to circulate through both the high-pressure side heat medium circulation circuit 21 and the low-pressure side heat medium circulation circuit 22.

Figure 17:
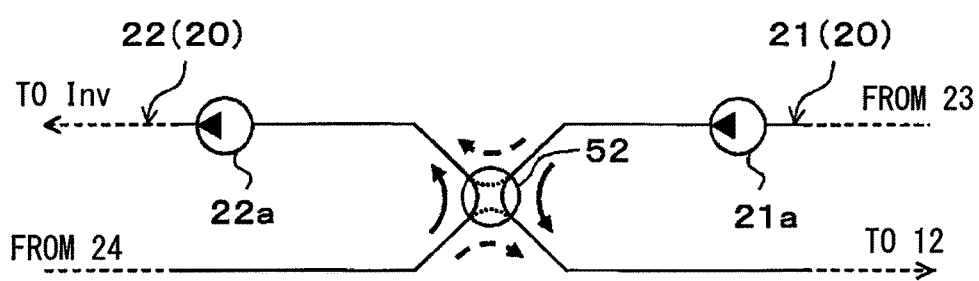
FIG. 17 is a schematic configuration diagram of a heat-medium circulation circuit, showing another heat-medium flow-rate adjustment device according to another embodiment.

Additionally, as shown in a schematic configuration diagram of the heat-medium circulation circuit 20 in FIG. 17, a four-way valve 52 may configure the heat-medium flow-rate adjustment device.

Specifically, the four-way valve 52 has a function of switching between a circuit for connecting the discharge port side of the high-temperature side coolant pump 21a to the coolant inlet side of the high-temperature side coolant-refrigerant heat exchanger 12 while simultaneously connecting the coolant outlet side of the radiator 24 to the suction port side of the low-temperature side coolant pump 22a, and a circuit for connecting the discharge port side of the high-temperature side coolant pump 21a to the suction port side of the low-temperature side coolant pump 22a while simultaneously connecting the coolant outlet side of the radiator 24 to the coolant inlet side of the high-temperature side coolant-refrigerant heat exchanger 12.

The four-way valve 52 performs switching to a coolant circuit as indicated by thick solid arrows of FIG. 17, so that the heat-medium circulation circuit can be configured to prevent the mixing of the coolant circulating through the high-pressure side heat-medium circulation circuit 21 and the coolant circulating through the low-pressure side heat-medium circulation circuit 22. As indicated by the thick dashed arrows of FIG. 17, the four-way valve 52 switches to a coolant circuit, whereby the heat-medium circulation circuit can be configured to allow for circulation of the whole coolant through both the high-pressure side heat-medium circulation circuit 21 and the low-pressure side heat-medium circulation circuit 22.

With the configurations shown in FIGS. 16 and 17, when switching to the circuit that allows the coolant to flow as indicated by thick dashed arrows, the whole coolant circulate through both the high-pressure side and low-pressure side heat-medium circulation circuits 21 and 22. Such a configuration may be adapted to intermittently switch between the circuit for flow of the coolant indicated by the thick solid arrows and the circuit for flow of the coolant indicated by the thick dashed arrows, thereby substantially adjusting the bypass flow rate.

(3) The respective components included in the heat pump system 1 are not limited to those disclosed in the above-mentioned embodiments.

Specifically, although as described in the above-mentioned embodiments, the electric compressor is employed as the compressors 11 and 11a by way of example, the form of the compressors 11 and 11a are not limited thereto. For example, the compressor suitable for use may be an engine-driven compressor that is driven by a rotational driving force transferred from the internal combustion engine (engine) via a pulley, a belt, etc.

This kind of engine-driven compressor suitable for use can be a variable displacement compressor that is capable of adjusting the refrigerant discharge capacity by changing the displaced volume thereof, a fixed displacement compressor that adjusts the refrigerant discharge capacity by changing an operating rate of the compressor through connection/disconnection of an electromagnetic clutch, and the like.

In the first embodiment, the exterior heat exchanger 14 and the radiator 24 are integrated together as the heat-exchanger structure 60 by way of example. However, integration of the exterior heat exchanger 14 and the radiator 24 is not limited thereto as long as they enable heat transfer between the refrigerant circulating through the exterior heat exchanger 14 and the coolant circulating through the radiator 24.

For example, the refrigerant tubes 14a and the heat-medium tubes 24a are alternately laminated to thereby form, between the adjacent refrigerant tube 14a and the heat-medium tube 24a, an air passage that allows for circulating of the outside air blown from the blower fan 14a. An outer fin 62 may be disposed in each air passage and bonded to both tubes 14a and 24a, thereby integrating the exterior heat exchanger 14 and the radiator 24 together. Further, the number of refrigerant tubes 14a may be set different from that of heat-medium tubes 24a.

Although in the fourth to sixth embodiments, the bypass passage on-off valve 18c is employed by way of example, instead of the valve 18c, an electric three-way valve may be employed that switches between a refrigerant circuit for connecting the liquid-phase refrigerant outflow port of the gas-liquid separator 28 to the inlet side of the intermediate fixed throttle 29, and another refrigerant circuit for connecting the liquid-phase refrigerant outflow port of the gas-liquid separator 28 to the inlet side of the fixed-throttle bypass passage 29a.

(4) In the first to ninth embodiments, during the dehumidification heating mode, the air conditioning controller 40 brings the heating expansion valve 13 into a throttle state, fully opens the cooling expansion valve 16, and controls the opening degree of the air mix door 34 such that the ventilation air temperature TAV approaches the target blow-out temperature TAO by way of example. The control in the dehumidification heating mode is not limited thereto.

For example, the air conditioning controller 40 may control the opening degree of the air mix door 34 so as to fully open the air passage on the side of the heater core 23, and may further control such that with increasing target blow-out temperature TAO, the throttle opening degree of the heating expansion valve 13 is gradually decreased while the throttle opening degree of the cooling expansion valve 16 is gradually increased.

Thus, with increasing target blow-out temperature TAO, the refrigerant circuit in which the exterior heat exchanger 14 functions as a radiator can be switched to that in which it functions as an evaporator. More specifically, in the refrigerant circuit where the exterior heat exchanger 14 serves as the radiator, the amount of heat dissipated from the refrigerant at the exterior heat exchanger 14 can be gradually decreased with increasing target blow-out temperature TAO. In the refrigerant circuit where the exterior heat exchanger 14 serves as the evaporator, which is switched from the above refrigerant circuit, the amount of heat absorbed in the refrigerant at the exterior heat exchanger 14 can be gradually increased with increasing target blow-out temperature TAO.

Thus, the amount of heat dissipated from the refrigerant at the high-temperature side coolant-refrigerant heat exchanger 12 can gradually increase with increasing target blow-out temperature TAO, so that the temperature of coolant heated by the high-temperature side coolant-refrigerant heat exchanger 12 can be increased to raise the temperature of the ventilation air.

In tenth to twelfth embodiments, during the dehumidification heating mode, the air conditioning controller 40 opens the exterior-device bypass passage on-off valve 18d by way of example, thereby switching to a refrigerant circuit in which the exterior heat exchanger 14 and the interior evaporator 17 are coupled in parallel with respect to the refrigerant flow. However, the control during the dehumidification heating mode is not limited thereto.

For example, two operation modes, namely, first and second dehumidification heating modes, are provided. In the first dehumidification heating mode, the air conditioning controller 40 closes the exterior-device bypass passage on-off valve 18d, thereby switching to the refrigerant circuit in which the exterior heat exchanger 14 and the interior evaporator 17 are connected in series. In the second dehumidification heating mode, the air conditioning controller 40 opens the exterior-device bypass passage on-off valve 18d, thereby switching to the refrigerant circuit in which the exterior heat exchanger 14 and the interior evaporator 17 are connected in parallel.

With increasing heating capacity for the ventilation air that is required for the heat pump cycle 10, the first dehumidification heating mode may be switched to the second dehumidification heating mode.

(5) In each of the above embodiments, during the air-heating mode, as described in FIG. 4, the bypass flow rate is increased with increasing heating capacity of ventilation air required for the heat pump cycle 10, thereby increasing the flow rate of coolant flowing out of the heater core 23 into the radiator 24 by way of example. However, the control in the air-heating mode is not limited thereto.

For example, the operation of the heat-medium flow-rate adjustment device (first and second coolant flow-rate adjustment valves 26a and 26b) may be controlled such that the bypass flow rate of coolant flowing out of the high-pressure side heat-medium circulation circuit 21 to the low-pressure side heat-medium circulation circuit 22 (that is, the bypass flow rate of coolant returning from the low-pressure side heat-medium circulation circuit 22 to the high-pressure side heat-medium circulation circuit 21) decreases with increasing heating capacity for the ventilation air that is required for the heat pump cycle 10.

With this arrangement, since the increase in temperature of the heating target fluid (ventilation air) can have priority over the suppression of frost formation at the exterior heat exchanger 14, for example, ventilation air can be soon heated immediately after the start of the air heating mode, thereby achieving the quick air-heating.

(6) Further, in the heat pump system 1 of the above-mentioned first to sixth, and tenth to twelfth embodiments, a temperature detector (coolant temperature sensor) is provided for detecting the temperature of coolant flowing out of the coolant passage provided in the inverter Inv as the external heat source. The bypass flow rate may be increased when the temperature of coolant Tw detected by the temperature detector is equal to or lower than a reference heat-medium temperature KTw determined to suppress the frost formation or defrost of the exterior heat exchanger 14.

Thus, the suppression of frost formation or defrosting of the exterior heat exchanger 14 can be surely executed, regardless of the operating modes, including the air-cooling mode, the dehumidification heating mode, and the air-heating mode. Further, the bypass flow rate may be increased when the exterior device temperature Ts detected by the exterior heat exchanger temperature sensor is equal to or lower than 0° C., and when the coolant temperature Tw is equal to or lower than the reference heat medium temperature KTw.

In the dehumidification heating mode or air-heating mode of each embodiment described above, part of the heat included in the coolant that is not used to heat the ventilation air as the heating target fluid may be positively used to suppress the frost formation of or to defrost the exterior heat exchanger 14. For example, when the ventilation air temperature TAV is equal to or higher than the target blow-out temperature TAO, the bypass flow rate may be increased.

(7) The above-mentioned first, second, fourth, fifth, seventh, eighth, tenth, and eleventh embodiments and the like have described an example in which the operation in the air-heating end mode is executed until the predetermined time has elapsed after an auto switch on the operation panel is turned OFF by the passenger during the air-heating mode. The execution of the air-heating end mode is not limited thereto.

For example, when the exterior device temperature Ts detected by the exterior heat exchanger temperature sensor becomes 0° C. or lower in a case where the auto switch on the operation panel is turned OFF by the passenger during the execution of the air-heating mode, the air-heating end mode may continue until the exterior device temperature becomes higher than 0° C.

In a vehicle that halts the operation of the engine when stopping, that is, the so-called idling stop vehicle, the heating of ventilation air by the heat pump cycle 10 may be stopped in synchronization with the operating state of the engine, thereby executing the operation in the air-heating end mode together with the stop of heating. During parking, the operation in the air-heating end mode may be performed.

(8) In the above respective embodiments, normal fluorocarbon refrigerant is used as the refrigerant by way of example, but the refrigerant is not limited to this kind. For example, a hydrocarbon refrigerant or carbon dioxide may be used. Further, the heat pump cycles 10 and 10a described above may be formed as a supercritical refrigeration cycle where its high-pressure side refrigerant pressure exceeds the critical pressure of the refrigerant.

(9) The configurations disclosed in the above respective embodiments may be combined within the feasible range as appropriate. For example, in the heat pump system 1 capable of configuring the gas injection cycle described in the fourth to sixth embodiments, the inverter Inv may not be connected to the low-pressure side heat-medium circulation circuit 22 as described in the seventh to ninth embodiments. As described in the tenth to twelfth embodiments, the high-pressure side branch portion 15c, the exterior-device bypass passage 51, and the bypass passage on-off valve 18c may also be added.

What is claimed is:

1. A heat pump system comprising:
   a heat pump cycle including a compressor adapted to compress and discharge a refrigerant, a heat medium-refrigerant heat exchanger that exchanges heat between a high-pressure refrigerant discharged from the compressor and a heat medium, a decompression device that decompresses the refrigerant flowing out of the heat medium-refrigerant heat exchanger, and an exterior heat exchanger that exchanges heat between the refrigerant decompressed by the decompression device and outside air;
   a first heat-medium circulation circuit in which the heat medium heated generally by the heat pump cycle circulates, the first heat-medium circulation circuit being provided with a heating heat exchanger that exchanges heat between a heating target fluid and the heat medium flowing out of the heat medium-refrigerant heat exchanger to heat the heating target fluid;
   a second heat-medium circulation circuit in which a heat medium having a temperature, different from that of the heat medium in the first heat-medium circulation circuit, circulates;
   a heat-medium radiation heat exchanger that is disposed in the second heat-medium circulation circuit and dissipates heat included in the heat medium flowing out of the heating heat exchanger of the first heat-medium circulation circuit, to a low-pressure refrigerant circulating through a range leading from an outlet side of the decompression device to a suction port of the compressor;
   a heat-medium flow-rate adjustment valve that adjusts a flow rate of the heat medium flowing out of the heating heat exchanger of the first heat-medium circulation circuit into the heat-medium radiation heat exchanger of the second heat-medium circulation circuit; and
   a heat-medium flow-rate controller configured to control an operation of the heat-medium flow-rate adjustment valve, based on a heating capacity of the heat pump cycle that is required for heating the heating target fluid in the first heat-medium circulation circuit, wherein
   the heat-medium flow-rate controller is configured to control the heat-medium flow-rate adjustment valve, based on a target temperature of the heating target fluid in the first heat-medium circulation circuit to increase the flow rate of the heat medium flowing out of the first heat-medium circulation circuit into the second heat-medium circulation circuit solely in accordance with an increase of the target temperature.

2. The heat pump system according to claim 1, wherein the heat-medium radiation heat exchanger exchanges heat between the heat medium flowing out of the heating heat exchanger and the outside air, and
   the heat-medium radiation heat exchanger and the exterior heat exchanger are integrated together to enable heat transfer between the heat medium circulating through the heat-medium radiation heat exchanger and the refrigerant circulating through the exterior heat exchanger.

3. The heat pump system according to claim 1, wherein the heat-medium radiation heat exchanger exchanges heat between the heat medium flowing out of the heating heat exchanger and the outside air, and
   the exterior heat exchanger is disposed to exchange heat between the outside air flowing out of the heat-medium radiation heat exchanger and the refrigerant decompressed by the decompression device.

4. The heat pump system according to claim 1, wherein the heat-medium radiation heat exchanger exchanges heat between the heat medium flowing out of the heating heat exchanger and the low-pressure refrigerant.

5. The heat pump system according to claim 1, wherein the heat-medium flow-rate adjustment valve is an electric flow-rate adjustment valve having a valve body and an electric actuator configured to adjust an opening degree by displacing the valve body.

6. The heat pump system according to claim 1, wherein the heat medium circulating in the first heat-medium circulation circuit is heated primarily by the heat pump cycle.

7. The heat pump system according to claim 1, wherein the exterior heat exchanger and the heat-medium radiation heat exchanger are integrated together and in direct fluid communication with each other so as to enable heat transfer between the refrigerant circulating through the exterior heat exchanger and the heat medium circulating through the heat-medium radiation heat exchanger.

8. The heat pump system according to claim 1, wherein the exterior heat exchanger and the heat-medium radiation heat exchanger are integrated together so as to be disposed on a windward side in a flow direction of an outside air blown by a blower fan.

9. The heat pump system according to claim 1, wherein the heating capacity of the heat pump cycle increases in accordance with the increase of the target temperature of the heating target fluid in the first heat-medium circulation circuit.

10. A heat pump system comprising:
a heat pump cycle including a compressor adapted to compress and discharge a refrigerant, a heat medium-refrigerant heat exchanger that exchanges heat between a high-pressure refrigerant discharged from the compressor and a heat medium, a decompression device that decompresses the refrigerant flowing out of the heat medium-refrigerant heat exchanger, and an exterior heat exchanger that exchanges heat between the refrigerant decompressed by the decompression device and outside air;
a first heat-medium circulation circuit in which the heat medium heated generally by the heat pump cycle circulates, the first heat-medium circulation circuit being provided with a heating heat exchanger that exchanges heat between a heating target fluid and the heat medium flowing out of the heat medium-refrigerant heat exchanger to heat the heating target fluid;
a second heat-medium circulation circuit in which a heat medium having a temperature, different from that of the heat medium in the first heat-medium circulation circuit, circulates;
a heat-medium radiation heat exchanger that is disposed in the second heat-medium circulation circuit and dissipates heat included in the heat medium flowing out of the heating heat exchanger of the first heat-medium circulation circuit, to a low-pressure refrigerant circulating through a range leading from an outlet side of the decompression device to a suction port of the compressor;
a heat-medium flow-rate adjustment valve that adjusts a flow rate of the heat medium flowing out of the heating heat exchanger of the first heat-medium circulation circuit into the heat-medium radiation heat exchanger of the second heat-medium circulation circuit; and
a heat-medium flow-rate controller configured to control an operation of the heat-medium flow-rate adjustment valve, that is adapted to increase a flow rate of the heat medium flowing out of the heating heat exchanger of the first heat-medium circulation circuit into the heat-medium radiation heat exchanger of the second heat-medium circulation circuit when the heat pump cycle is requested to stop heating the heating target fluid, wherein
the heat-medium flow-rate controller is configured to control the heat-medium flow-rate adjustment valve, based on a target temperature of the heating target fluid in the first heat-medium circulation circuit to increase the flow rate of the heat medium flowing out of the first heat-medium circulation circuit into the second heat-medium circulation circuit solely in accordance with an increase of the target temperature.

11. The heat pump system according to claim 10, wherein the heat-medium flow-rate adjustment valve is an electric flow-rate adjustment valve having a valve body and an electric actuator configured to adjust an opening degree by displacing the valve body.

12. The heat pump system according to claim 10, wherein the heat medium circulating in the first heat-medium circulation circuit is heated primarily by the heat pump cycle.

13. The heat pump system according to claim 10, wherein the exterior heat exchanger and the heat-medium radiation heat exchanger are integrated together and in direct fluid communication with each other so as to enable heat transfer between the refrigerant circulating through the exterior heat exchanger and the heat medium circulating through the heat-medium radiation heat exchanger.

14. The heat pump system according to claim 10, wherein the exterior heat exchanger and the heat-medium radiation heat exchanger are integrated together so as to be disposed on a windward side in a flow direction of an outside air blown by a blower fan.

15. A heat pump system comprising:
a heat pump cycle including a compressor adapted to compress and discharge a refrigerant, a heat medium-refrigerant heat exchanger that exchanges heat between a high-pressure refrigerant discharged from the compressor and a heat medium, an expansion valve that decompresses the refrigerant flowing out of the heat medium-refrigerant heat exchanger, and an exterior heat exchanger that exchanges heat between the refrigerant decompressed by the expansion valve and outside air;
a first heat-medium circulation circuit in which the heat medium heated generally by the heat pump cycle circulates, the first heat-medium circulation circuit being provided with a heating heat exchanger that exchanges heat between a heating target fluid and the heat medium flowing out of the heat medium-refrigerant heat exchanger to heat the heating target fluid;
a second heat-medium circulation circuit in which a heat medium having a temperature, different from that of the heat medium in the first heat-medium circulation circuit, circulates;
a heat-medium radiation heat exchanger that is disposed in the second heat-medium circulation circuit and dissipates heat included in the heat medium flowing out of the heating heat exchanger of the first heat-medium circulation circuit, to a low-pressure refrigerant circulating through a range leading from an outlet side of the expansion valve to a suction port of the compressor;
a heat-medium flow-rate adjustment valve that adjusts a flow rate of the heat medium flowing out of the heating heat exchanger of the first heat-medium circulation circuit into the heat-medium radiation heat exchanger of the second heat-medium circulation circuit; and
a heat-medium flow-rate controller configured to control an operation of the heat-medium flow-rate adjustment valve, that is adapted to increase a flow rate of the heat medium flowing out of the heating heat exchanger of the first heat-medium circulation circuit into the heat-medium radiation heat exchanger of the second heat-medium circulation circuit when a temperature of the heat medium heated by the external heat source is equal to or lower than a predetermined reference heat-medium temperature, wherein
an external heat source is disposed in the second heat-medium circulation circuit so as to heat the heat medium that is to flow into the heat-medium radiation heat exchanger, and
the heat-medium flow-rate controller is configured to control the heat-medium flow-rate adjustment valve, based on a target temperature of the heating target fluid in the first heat-medium circulation circuit to increase the flow rate of the heat medium flowing out of the first heat-medium circulation circuit into the second heat-medium circulation circuit solely in accordance with an increase of the target temperature.

16. The heat pump system according to claim 15, the heat pump system being applied to an air conditioner for a vehicle, wherein
the external heat source is a vehicle-mounted device that generates heat during operation, and
the heating target fluid is ventilation air to be blown into a vehicle interior.

17. The heat pump system according to claim 15, wherein the heat-medium flow-rate adjustment valve is an electric flow-rate adjustment valve having a valve body and an electric actuator configured to adjust an opening degree by displacing the valve body.

18. The heat pump system according to claim 15, wherein the heat medium circulating in the first heat-medium circulation circuit is heated primarily by the heat pump cycle.

19. The heat pump system according to claim 15, wherein the exterior heat exchanger and the heat-medium radiation heat exchanger are integrated together and in direct fluid communication with each other so as to enable heat transfer between the refrigerant circulating through the exterior heat exchanger and the heat medium circulating through the heat-medium radiation heat exchanger.

20. The heat pump system according to claim 15, wherein the exterior heat exchanger and the heat-medium radiation heat exchanger are integrated together so as to be disposed on a windward side in a flow direction of an outside air blown by a blower fan.

* * * * *